(12) United States Patent
Jorgensen

(10) Patent No.: US 8,794,588 B1
(45) Date of Patent: Aug. 5, 2014

(54) HIGH PRESSURE ACTUATOR REGULATING VALVE

(75) Inventor: Alfred Douglas Jorgensen, Pasadena, CA (US)

(73) Assignee: Metrex Valve Corp., Glendora, CA (US)

( * ) Notice: Subject to any disclaimer, the term of this patent is extended or adjusted under 35 U.S.C. 154(b) by 116 days.

(21) Appl. No.: 13/566,261

(22) Filed: Aug. 3, 2012

Related U.S. Application Data

(60) Provisional application No. 61/515,112, filed on Aug. 4, 2011.

(51) Int. Cl.
*F16K 31/12* (2006.01)
*F16K 31/00* (2006.01)
*F16K 39/00* (2006.01)

(52) U.S. Cl.
USPC .............................. 251/57; 251/63.5; 251/282

(58) Field of Classification Search
USPC ......... 251/57, 62, 63, 63.5, 63.6, 48, 54, 281, 251/282
See application file for complete search history.

(56) References Cited

U.S. PATENT DOCUMENTS

| | | | |
|---|---|---|---|
| 1,958,814 A | 5/1934 | Carson, Jr. | |
| 1,965,552 A | 7/1934 | Lear | |
| 1,979,109 A | 10/1934 | Johnson | |
| 2,301,031 A * | 11/1942 | Ferguson | ............................ 92/43 |
| 2,315,665 A | 4/1943 | Sengstaken | |
| 2,465,560 A | 3/1949 | Warnke | |
| 2,469,038 A | 5/1949 | Winkler | |
| 2,616,451 A | 11/1952 | Hunter | |
| 2,618,125 A | 11/1952 | Fischer | |
| 2,681,044 A | 6/1954 | Eggenberger | |
| 2,719,535 A | 10/1955 | Anderson | |
| 2,747,614 A | 5/1956 | Gray | |
| 2,790,427 A | 4/1957 | Carson | |
| 2,919,883 A | 12/1958 | Murphy | |
| 2,885,173 A | 5/1959 | Dobrick | |
| 2,920,859 A * | 1/1960 | Holmes | .......................... 251/282 |
| 3,046,740 A | 7/1962 | Perkey et al. | |
| 3,047,022 A | 7/1962 | Aldinger | |
| 3,051,432 A * | 8/1962 | Sullivan | ...................... 251/30.01 |
| 3,183,672 A | 5/1965 | Morgan | |
| 3,219,310 A | 11/1965 | Baumann | |

(Continued)

FOREIGN PATENT DOCUMENTS

WO     WO87/02153    *   4/1987  ............. G05D 16/06

*Primary Examiner* — John K Fristoe, Jr.
*Assistant Examiner* — Michael R Reid
(74) *Attorney, Agent, or Firm* — One 3 IP Management, P.C.; Jeromye V. Sartain; Justin G. Sanders

(57) ABSTRACT

An actuator regulating valve apparatus comprising an actuator assembly operably installed within a valve body assembly, a bellows assembly operably installed adjacent to the actuator assembly, a biasing assembly operably installed on the valve body assembly substantially opposite the bellows assembly and configured to bias the apparatus closed, and a non-compressible liquid filling the apparatus about a bellows of the bellows assembly and the effective working surface of a piston of the actuator assembly and communicating therebetween through an orifice. Alternatively, an actuator rolling diaphragm is configured so as to partially cover the piston and to have a convolution loop supported by a U-shaped insert within a groove about the piston. Further alternatively, a balancing diaphragm sub-assembly of the biasing assembly acts on a pushrod of the actuator assembly to produce a force substantially equal and opposite to the pressure in an inlet side of the apparatus.

17 Claims, 6 Drawing Sheets

Fig. 5A

(56) References Cited

U.S. PATENT DOCUMENTS

| | | |
|---|---|---|
| 3,291,440 A | 12/1966 | Archer et al. |
| 3,377,922 A | 4/1968 | Spender et al. |
| 3,446,241 A | 5/1969 | Skoli |
| 3,552,422 A | 1/1971 | Michelson |
| 3,565,109 A | 2/1971 | Smith |
| 3,664,369 A | 5/1972 | Johnson |
| 3,766,834 A | 10/1973 | Kramer |
| 3,768,770 A | 10/1973 | Kayser |
| 3,858,842 A | 1/1975 | Yoshimura |
| 4,016,722 A | 4/1977 | Niederer, Sr. |
| 4,114,643 A * | 9/1978 | Aoyama et al. ............... 137/495 |
| 4,228,777 A | 10/1980 | Haase |
| 4,271,859 A | 6/1981 | Lawsing |
| 4,593,654 A | 6/1986 | McInerney |
| 5,186,209 A | 2/1993 | McManigal |
| 5,305,981 A | 4/1994 | Cunningham et al. |
| 5,346,042 A | 9/1994 | Paskus |
| 5,487,454 A | 1/1996 | Klembczyk et al. |
| 5,791,227 A | 8/1998 | Takaku et al. |
| 5,839,413 A | 11/1998 | Krause et al. |
| 6,293,514 B1 * | 9/2001 | Pechoux et al. ............... 251/122 |
| 6,318,405 B1 | 11/2001 | Brandt et al. |
| 6,328,054 B1 | 12/2001 | Martin et al. |
| 6,527,093 B2 | 3/2003 | Oliver et al. |
| 6,589,020 B2 | 7/2003 | Kimura et al. |
| 6,637,228 B2 | 10/2003 | Umemura et al. |
| 6,663,356 B2 | 12/2003 | Ota et al. |
| 6,668,855 B2 | 12/2003 | Heald et al. |
| 6,685,164 B1 | 2/2004 | Koizumi et al. |
| 6,807,984 B2 | 10/2004 | Volovets et al. |
| 6,832,628 B2 | 12/2004 | Thordarson et al. |
| 2004/0004199 A1 * | 1/2004 | Igarashi ...................... 251/63.5 |

\* cited by examiner

HIGH PRESSURE ACTUATOR REGULATING VALVE

RELATED APPLICATIONS

This application claims priority and is entitled to the filing date of U.S. Provisional application Ser. No. 61/515,112, filed on Aug. 4, 2011, and entitled "High Pressure Actuator Regulating Valve." The contents of the aforementioned application are incorporated by reference herein.

INCORPORATION BY REFERENCE

Applicant hereby incorporates herein by reference any and all U.S. patents and U.S. patent applications cited or referred to in this application.

BACKGROUND OF THE INVENTION

1. Field of the Invention

Aspects of this invention relate generally to fluid valves and actuators, and more particularly to combination high pressure actuator regulating valves.

2. Description of Related Art

By way of background, in connection with refrigeration and cooling systems it is generally known to employ flow control valves that selectively shut off the flow of water or water-based coolant in a first line based on the refrigerant pressure in a second line so as to set up a dynamic and more efficient refrigeration cycle. It is further known to employ a bellows-style flow control valve in such applications, wherein the pressure in the refrigerant line would act on one side of the bellows and thereby cause an expansion or contraction of the bellows that translates through some kind of linkage to mechanical movement of the valve operably installed within the water line. While such bellows-type valves have been generally sufficient as used in the art, with the advent of high pressure refrigerants, such valves have been rendered less effective and even un-operable or non-compliant with relevant codes. In fact, the Environmental Protection Agency (EPA), through the Clean Air Act, is currently regulating the production and use of refrigerants more closely. These changes will eventually eliminate air conditioning and heat pump refrigerants containing chlorine, due to growing concerns about ozone depletion. As such, HCFC refrigerants like commonly-used R12, R22 and R407c are being phased out and are no longer to be in use by the year 2015. R410A is an HFC refrigerant that has been developed to replace HCFC refrigerants like R22 and meet these standards. R410A operates efficiently, but at pressures on the order of 1.6 times the pressure for other refrigerants such as R22, or currently at system pressures of up to about 650 psi. The practical effect on valve design of such a pressure requirement is actually by a factor of two-and-a-half to five times, as UL approval requires either (a) 500,000 cycles at 2.5× design pressure or (b) 5× proof pressure with no cycling. Accordingly, these higher pressure requirements have introduced new challenges for traditional bellows-style valves. The present invention is directed to meeting these needs and providing further advantages over prior art flow control valves. However, as will be appreciated from the following disclosure, the technology developed for this refrigeration context, namely, a high pressure actuator regulating valve, may be employed in other high pressure contexts as well, such that it is to be understood that the refrigeration valve context of the present invention is merely illustrative of aspects of the present invention.

The following art defines the present state of this field:

U.S. Pat. No. 1,958,814 to Carson, Jr. is directed to a temperature regulator employing opposed expansible and collapsible corrugated metal walls or bellows with an interposed valve member.

U.S. Pat. No. 1,965,552 to Lear is directed to a control valve structure in which a valve housing is closely encompassed by a bellows for the dual purpose of obtaining a compact unit and providing heat exchange between the housing and bellows. This structure is specially adapted for use in conjunction with an expansible portion of a thermostatic device which may be mounted in relatively intimate relation with the bellows without substantial heat transference from the expansible portion of the bellows.

U.S. Pat. No. 1,979,109 to Johnson is directed to a valve having improved balancing means adapted to render the valve extremely sensitive to changes in the pressure of the vapor and, consequently, sensitive to changes in the temperature of the medium in which the thermostat is located and having improved means for guiding the throttle toward and away from its seat.

U.S. Pat. No. 2,315,665 to Sengstaken is directed to a control system for controlling the rate of delivery of feed water to boiler furnaces in accordance with water level and in with changes in the rates of combustion as required by the demand for steam.

U.S. Pat. No. 2,465,560 to Warnke is directed to a leak-proof cylinder adapted for use as a pneumatic, hydraulic, or any fluid operated cylinder.

U.S. Pat. No. 2,469,038 to Winkler is directed to a pressure sensitive mechanism, and particularly to corrugated metal bellows of the type used to control a device (such as a valve or a switch) as a function of pressure changes either on the exterior or on the interior of the bellows, or as a function of temperature changes to which the unit is subjected, or as a correlated function of both temperature and pressure changes to accomplish density responsiveness.

U.S. Pat. No. 2,616,451 to Hunter is directed to improvements in automatically operable thermostatic apparatus using cubical expansion of a vaporized volatile fluid to produce a mechanical result, providing an improved pressure generator which includes a casing to be located within the space where a controlled temperature is desired, the casing closely confining a volatile liquid in which is mounted a bellows or hollow contractible element which is completely filled with a non-compressible liquid, and further providing an improved valve and quick acting valve operating mechanism, the valve being interposable in a fuel line of a burner for heating said space and which includes a bellows or a suitable fluid operated means connected by a line to said pressure generator and to coordinate the operation of said elements with other elements disclosed to provide a highly efficient system of temperature control.

U.S. Pat. No. 2,618,125 to Fischer is directed to an apparatus for the control of the pressure ratios which may exist across the inlet and outlet of elastic fluid devices such as the fluid expansion turbines utilized in the air conditioning of aircraft.

U.S. Pat. No. 2,681,044 to Eggenberger is directed to a hydraulic-mechanical device for overcoming inherent instability in a hydraulic regulator used to control the steam supply to the shaft packing seal of a steam turbine type of prime mover.

U.S. Pat. No. 2,719,535 to Anderson is directed to systems whereby a variable condition such as furnace draft, may be regulated automatically or manually, and more particularly, to a system having means that may be located at a point remote from the furnace or point of regulation for transferring the regulating operation from automatic to manual, or vice versa.

U.S. Pat. No. 2,747,614 to Gray is directed to a compensating bellows system acting to supplement the response of an opposed bellows. The compensating bellows system is liquid filled and is connected through a restriction with the liquid filling the opposed bellows so that upon any change the effect of the compensating bellows has a rate relating to the change in the pressure differential which modifies the compensation. By this expedient, the compensating bellows system corrects for lag or hysteresis in the opposed bellows.

U.S. Pat. No. 2,790,427 to Carson is directed to improvements in high performance servo valves on the type in which the position of a slide valve determines the flow of pressurized fluid from a supply source to a ram or other load. More particularly, the invention concerns such a servo valve in which the slide valve position is controlled by an electro-hydraulic actuator functioning to convert a low-level electrical signal into a proportional hydraulic control pressure reduced by the actuator from the supply source and acting on one end of the slide valve in opposition to the pressure of the supply source acting on a differential area thereof. The pressure of the supply source is generally considered as constant, but in actual practice it is usually subject to pressure fluctuations which may have a fluctuation frequency as high as or greater than 250 cycles/sec. This invention aims to so dynamically balance the slide valve that the accuracy and sensitivity of the servo will not be effected by such pressure fluctuations.

U.S. Pat. No. 2,885,173 to Dobrick is directed to valves of the type operated by fluid pressure to open and close a fluid passage configured to reduce the tendency of obstructions such as ice and dirt to interfere with effective operation and with an improved bellows arrangement for operating the valve, characterized by a novel construction of the bellows and an associated spring.

U.S. Pat. No. 2,919,883 to Murphy is directed to a liquid damped vibration isolator and more particularly to a vibration isolator including means to provide fluid damping of movements in horizontal and vertical planes.

U.S. Pat. No. 3,046,740 to Perkey et al. is directed to a fluid pressure responsive control apparatus, including an evacuated bellows member or the like, configured to be less susceptible to physical vibration and to have a much higher natural frequency of vibration than is likely to occur in the course of its usage.

U.S. Pat. No. 3,047,022 to Aldinger is directed to differential pressure responsive devices of the liquid-filled type having a plurality of flexible walls some of which are exposed to the pressures of which the difference is to be sensed for control, indication, or the like, such devices being adapted to be coupled to the aforesaid pressures and to produce a motion output of an order suitable for positioning the core of a differential transformer, for operating a mechanical linkage, and so on.

U.S. Pat. No. 3,183,672 to Morgan is directed to pressure responsive devices for displacing an actuator element in response to pressure applied to a flexible wall member. More particularly, the invention is concerned with protection of the flexible wall member when the applied pressure exceeds a predetermined value which would normally damage the member. The basic idea of the overpressure protection feature is to support the side of a bellows opposite that side which is acted on by the applied pressure. The unique overpressure protection arrangement of the invention is effective to create a pressure balance which opposes the forces of the applied pressure but only when the applied pressure exceeds a predetermined value that would normally damage the bellows. To accomplish this pressure balance a second flexible wall member in the form of a flexible diaphragm cooperates with the bellows to define a fluid filled enclosure. The fluid in this enclosure is preferably a liquid so that the volume of liquid displaced by movement of the bellows is accommodated by movement of the diaphragm. The extent of displacement of the diaphragm beyond a predetermined maximum is prevented by the cooperating wall portions of the housing and an actuator movable relative to the housing. The movement of the actuator is limited so that the diaphragm cannot be displaced to accommodate more than a predetermined volume of liquid.

U.S. Pat. No. 3,219,310 to Baumann is directed to valves operated by integral components within the valve housing outside of the valve flow channel, namely, an improved valve which eliminates many of the components which cause sealing, wear and freezing problems; which has an operator integrally formed therein; which can be opened or closed responsive to a signal from an outside source; which has a sealed flow channel therein; which may be designed to be normally closed; which has a simple, compact, rugged, reliable and efficient design; which utilizes components which are self aligning; which may readily be assembled and disassembled; and which may be operated by fluid pressure, which reduces radiation heat loss.

U.S. Pat. No. 3,291,440 to Archer et al. is directed to new and useful improvements in valves, and has particular reference to valves adapted to be controlled by air, oil or other fluid supplied thereto independently of the fluid in the pipe or other conduit controlled by the valve itself.

U.S. Pat. No. 3,377,922 to Spender et al. is directed to an ambient pressure compensated transmission throttle valve control having a precalibrated bellows subassembly and having an improved means for supporting and reinforcing the diaphragm.

U.S. Pat. No. 3,446,241 to Skoli is directed to a fluid-actuated valve operator in which a pair of valve casings and a medially disposed spacer ring define a diaphragm chamber. Flexible diaphragms are secure respectively between each of the casings and the spacer ring. One of the casings and the spacer ring are perforated to admit control fluid for selectively manipulating the two diaphragms and thereby the associated valve element.

U.S. Pat. No. 3,552,422 to Michelson is directed to a valve assembly for use in pipelines including a main valve housing having a valve chamber with opposed inlet and outlet ports. Valve heads in the chamber are advanced toward the respective ports to close the same. Auxiliary valves are disposed in housings between said ports and the downstream and upstream portions of the pipeline to close the pipelines for isolating the main valve housing so as to prevent loss of fluid or of pressure in the lines while the main valve housing is removed for purposes of repair or replacement. All valves are actuated by expandable bellows in response to the pressure of a control fluid.

U.S. Pat. No. 3,565,109 to Smith is directed to a fuel emission control system comprising a gas tank and interconnecting lines with an inflatable tank and a pressure responsive valve which is operable to vent the excess pressure in the fuel tank and the inflatable tank to the atmosphere through emission absorptive material.

U.S. Pat. No. 3,664,369 to Johnson is directed to a pressure regulator of the "straight-through" type employs a stationary valve member clamped between axially aligned tubes carried on inlet and outlet body parts. A flexible diaphragm clamped between the body parts has a seat ring cooperating with a face on the valve member to provide a fully balanced valve construction controlling flow of fluid between the inlet tube and the outlet tube. An inner rim on the diaphragm is clamped between the stationary member and the inlet tube, and a tubular portion of the diaphragm slidably receives the outlet tube. Concentric axially extending convolutions each "U" shaped in cross-section provide rolling diaphragm action adjacent the inner and outer peripheries. A control screen downstream from the stationary valve member diffuses high velocity flow issuing between the valve face and seat ring, and passage means establish communication between the fluid downstream from the control screen and a chamber defined between the diaphragm and the inlet body part. A spring within the body acts to move the diaphragm in a direction opposed by pressure in the chamber. Stiffener plates confine a central portion of the diaphragm between them and are secured together in a manner to eliminate any leakage path. Tubular projections on one plate extend through aligned apertures in the diaphragm and in other plate, each projection having an enlarged integral end wall forming a clamping lip.

U.S. Pat. No. 3,766,834 to Kramer is directed to is a pressostat assembly which includes two bellows, one inside the other, which have fluid communication. Both bellows are fixedly attached to a rod form of operating member and the outer bellows operates to impart a closing movement to the operating member if the inner bellows should develop a leak. The effective cross sectional area of the outer bellows is larger that that of the inner bellows.

U.S. Pat. No. 3,768,770 to Kayser is directed to a valve that has a housing provided with an inlet for pressurized fluid, a valve seat having a seating surface, and a valve member exposed to the incoming pressurized fluid and having a cooperating surface juxtaposed and normally in engagement with the seating surface. At least one of these surfaces is provided with a shallow recess in which a conduit terminates which communicates with the inlet so as to admit into the recess sufficient pressurized fluid to lift the valve member off the valve seat. A control valve is interposed in the conduit and can be operated to permit the flow of pressurized fluid therethrough and into the recess.

U.S. Pat. No. 3,858,842 to Yoshimura is directed to a control valve device for closing and opening a fluid passage in response to a pressure signal is provided with a chamber composed of a pair of bellows for elongating and crumpling in accordance with the pressure signal thereby to achieve adequate closing and opening operation in such dusty and high temperature fluid as the exhaust gas emitted from an internal combustion engine.

U.S. Pat. No. 4,016,722 to Niederer, Sr. is directed to a fluid actuator in which excessive pressure is relieved by controlled destruction of an internal extensible diaphragm without damage to the exterior structural integrity of the actuator. Upon occurrence of such abnormal excessive pressure in the actuator pressure chamber, the diaphragm, which is otherwise substantially supported, is permitted to deform at a known location until fracturing thereof occurs to release fluid from the pressure chamber. In one form the invention comprises an opening in the actuator guide cap and in other forms comprises openings in the actuator piston or an enlargement in part of the guide cap.

U.S. Pat. No. 4,228,777 to Haase is directed to an adjustable bellows mechanism in a fuel control apparatus for balancing the internal forces of a valve arrangement to establish a fuel flow from the control apparatus to an engine corresponding to the optimum operational parameter of the engine.

U.S. Pat. No. 4,271,859 to Lawsing is directed to a pressure or temperature sensor that translates a pressure or temperature signal into a hydraulic pressure signal. The sensor or transducer utilizes no bearings, levers or pivots that would introduce errors and the control plate is supported within the casing only by bellows. The transducer has use in transmitting a hydraulic pressure signal to the fuel control in a gas turbine in response either to a pressure or temperature signal such as engine inlet temperature or compressor discharge pressure.

U.S. Pat. No. 4,593,654 to McInerney is directed to a feedwater controller for a flash type water tube boiler wherein feedwater flow through steam generating coils heated by combustion gases is compensated and adjusted, in order to provide proper combustion heat input over a broad range of boiler operating pressures and feedwater temperatures. Flowing feedwater affects combustion heat input through predetermined variations in fuel and air input to the boiler's burner. As disclosed, the first embodiment utilizes temperature and pressure compensating gates in a cylindrical orifice containing a spherical flow control member. Fuel/air control of the generator is provided through movement of the flow control member due to the forces induced by flowing feedwater. In an alternate embodiment, utilizes a piston in the feedwater flow path having a slotted cylindrical metering orifice attached thereto. Internal of the cylindrical orifice is a cooperating temperature compensated helical flow control member. Feedwater flow adjustments over a wide range of feedwater temperature is provided.

U.S. Pat. No. 5,186,209 to McManigal is directed to a high pressure gas regulator, the combination comprising an axially movable poppet and an orifice controlled by the poppet in response to poppet axial movement, the orifice having upstream and downstream sides; a main diaphragm responsive to gas pressure at the downstream side of the orifice and operatively connected with the poppet to control poppet movement toward or away from the orifice in response to an increase or decrease in pressure a the downstream side of the orifice, respectively, auxiliary pressure responsive structure at the upstream side of the orifice, moving the poppet and orifice together or apart in response to a decrease or increase in pressure at the upstream side of the orifice, respectively, and housing structure enclosing the poppet, orifice, main diaphragm, and auxiliary pressure responsive structure.

U.S. Pat. No. 5,305,981 to Cunningham et al. is directed to a system for isolating a supported structure from transmitting vibrations to a supporting base in a spacecraft provides six degrees of freedom in a kinematic mounting. Six isolator elements in a symmetric arrangement of three skewed isolator pairs provides viscous damping and vibration and shock attenuation during launch and operation in space. The isolators employ two degrees of freedom flexure joints at each mounting point to assure primarily axial deflection and minimize bending moments, and have tuning springs to optimize performance. The system permits deterministic design and allows calculation of all loads from the nominal geometry and the isolator axial stiffness. Limit stops are provided between the supporting structure and the supported structure to limit excursions of the isolator members.

U.S. Pat. No. 5,346,042 to Paskus is directed to a valve for setting the dampening level of a fluidic suspension strut. The valve is especially suited for use within suspension struts of the kind having a cylinder, a telescopically interfitted piston, and an annulus between the cylinder and the interfitted piston. The valve includes a valve body, a valve stem, a housing, and a pressure sensing assembly. The valve responds to steadystate, load-induced pressure variations in the piston to regulate the flow of the fluid and the resulting damping characteristics of the strut.

U.S. Pat. No. 5,487,454 to Klembczyk et al. is directed to a hydraulic damper including a cylinder and a piston rod and a seal for the piston rod and a metal bellows fixedly mounted between the cylinder and the piston rod for accepting leakage of hydraulic fluid from the cylinder, and a spring arrangement encircling the cylinder and piston rod, the spring arrangement consisting of two equal length, equal size springs wound in opposite directions with their outer ends fixed to the cylinder and piston rod and having their inner ends bearing against each other to eliminate the application of torque from the springs to the bellows.

U.S. Pat. No. 5,791,227 to Takaku et al. is directed to a control valve is disclosed which is capable of supplying a required control pressure to an actuator such as a brake booster, for example. The control valve includes a valve mechanism within a housing, and the valve mechanism comprises a piston which is associated with a solenoid. When the solenoid is excited, the piston is driven for movement to switch a flow path within the housing. In this manner, the atmosphere, acting as a control pressure, is introduced into a variable pressure chamber defined within the housing. The atmosphere which is introduced into the variable pressure chamber is arranged to push back the piston, so that a control pressure which depends on the magnitude of a current passing through the solenoid can be generated within the variable pressure chamber. As compared with a prior art arrangement, the control valve of the invention reduces the cost of the entire arrangement, and allows a piping arrangement for pressure fluid to be simplified.

U.S. Pat. No. 5,839,413 to Krause et al. is directed to a priming system for a hydraulically actuated, electronically controlled unit injector fuel systems used on diesel engines and the like includes an accumulator charged at low pressure and in fluid communication with the manifold/rail passages leading to the individual fuel injectors, which passages are pressurized upon engine startup by the system's high pressure pump to actuate the injectors. The accumulator is plumbed into the hydraulic system by one way check valves which isolate the accumulator from the high pressure pump to permit the high pressure pump and the priming system to be located at any convenient position within the vehicle's engine compartment irrespective of their position relative to the manifold/rail passages.

U.S. Pat. No. 6,318,405 to Brandt et al. is directed to a pressure regulator body having an inlet port and an outlet port having a pressure regulator valve disposed in said pressure regulator body, said valve being moveable between and open and a closed position and being responsive to open or close the valve based at least in part on a differential pressure between the pressure in the outlet port and the pressure in the inlet port. A chamber in the pressure regulator body on the outlet port side of the valve has a conduit extending from the outlet port into said chamber. This conduit has an inside and an outside and an open end which is spaced from the valve whereby flow through the conduit flowing will pull fluid from the chamber which is located radially outwardly from said conduit as well as allowing flow directly from the valve to the open end in the conduit. The effect of this arrangement is to quickly cause less flow to a fuel tank and more flow to an engine during a desired rapid acceleration of rpm of such engine. Furthermore, in a preferred embodiment, a control spring is disposed the chamber for biasing the valve toward the closed position thereof.

U.S. Pat. No. 6,328,054 to Martin et al. is directed to a balanced fluid pressure regulator of the disclosed embodiment comprises a balancing bellows inside a sensing bellows to minimize the supply pressure effect for improved performance while reducing the size and weight of the regulator in comparison to a conventional regulator. A sensing duct communicates the enclosed space between the bellows with the fluid passage of the regulator downstream from a poppet valve. The cross-sectional area of the fluid passage is reduced in the vicinity of the sensing duct for decreasing the pressure in the enclosed space at high gas flow rates. The valve seat in the regulator is supported so it is free to move during assembly of the regulator to self-align the seat with the poppet valve.

U.S. Pat. No. 6,527,093 to Oliver et al. is directed to a vibration damper for a vehicle suspension system includes a pumping cylinder concentrically aligned inside a housing defining a pumping chamber having a piston stroking therein for reducing the level of vehicle vibration. An intermediate cylinder defines an intermediate chamber with the pumping cylinder and an outer chamber with the housing. Suspension fluid flows throughout each of the chambers. A valve is operably connected to an air supply of a suspension system having an air pressure relative to a mass loaded on the vehicle. The controls the distribution of fluid between the chambers relative to the pressure of the air supply and controls the amount of vibration damping inside the pumping chamber relative to the mass loaded on the vehicle.

U.S. Pat. No. 6,589,020 to Kimura et al. is directed to a control valve used for a variable displacement type compressor. The compressor has a crank chamber, a discharge pressure zone, and a supply passage. The supply passage connects the crank chamber to the discharge pressure zone. The control valve is located in the supply passage. The control valve has a valve body. The valve body adjusts the size of the opening of the supply passage in accordance with the discharge pressure. The valve body is exposed to the pressure of the supply passage. The valve body moves in accordance with the discharge pressure such that the displacement is varied to counter changes of the discharge pressure. The direction in which the valve body moves in response to an increase of the discharge is the same as the direction in which the valve body moves when the pressure of the supply passage increases.

U.S. Pat. No. 6,637,228 to Umemura et al. is directed to a control valve used for a variable displacement compressor installed in a refrigerant circuit of an air conditioner. The compressor has a control chamber and a control passage, which connects the control chamber to a pressure zone in which the pressure is different from the pressure of the control chamber. The control valve has a valve body, which is accommodated in the valve chamber for adjusting the opening size of the control passage. A pressure sensing member moves in accordance with the pressure difference between two pressure monitoring points located in the refrigerant circuit. The pressure sensing member moves the valve body such that the displacement of the compressor is varied to counter changes of the pressure difference. The force applied by an actuator corresponds to a target value of the pressure difference. The pressure sensing member moves the valve body such that the pressure difference seeks the target value. An urging member is accommodated in the valve chamber. The urging member urges the valve body in a direction to open the control passage.

U.S. Pat. No. 6,663,356 to Ota et al. is directed to a control valve used for a variable displacement compressor. The compressor has a crank chamber and a bleed passage. The control valve includes a valve housing. A valve chamber is defined in the valve housing. A valve body is accommodated in the valve chamber for adjusting the opening size of the bleed passage. A pressure sensing chamber is defined in the valve housing. A pressure sensing member separates the pressure sensing chamber into a first pressure chamber and a second pressure chamber. The pressure at a first pressure monitoring point is applied to the first pressure chamber. The pressure at a second pressure monitoring point located is applied to the second pressure chamber. The pressure sensing member moves the valve body in accordance with the pressure difference between the first pressure chamber and the second pressure chamber such that the displacement of the compressor is varied to counter changes of the pressure difference. The pressure sensing member is a bellows or a diaphragm.

U.S. Pat. No. 6,668,855 to Heald et al. is directed to a pressure regulator having a housing with an inlet port and an outlet port. A plug is located within the housing and dividing the housing into an upper chamber and a lower chamber, with the upper and lower chamber being connected by a vent. The plug includes a fluid path between the inlet port and the bore. A yoke is adapted selectively close the fluid path in the plug. A diaphragm is located in the upper chamber and is connected to the yoke. A biasing member biases the yoke to open the fluid path through the plug. The diaphragm is configured to move the yoke to open the fluid path when pressure in the lower chamber and vented to the upper chamber through the vent is above a predetermined amount. The pressure regulator can also include a second biasing member used to positively close the fluid path through the plug.

U.S. Pat. No. 6,685,164 to Koizumi et al. is directed a control valve having a high durability, so that the valve is not easily damaged even in case that the valve is provided in a corrosion gas current path. The valve has a construction such that a diaphragm (4) is contained in the valve body (2), which has a valve chamber (23) between the gas current in path (25) and the gas current out path (26). The diaphragm 4 is urged against an opening (252) formed in the center of the valve seat 231 in the valve chamber (23) to open and close the opening. The valve has a valve control member (5), which has a clamping member (3) to clamp the diaphragm and is made to contact to the diaphragm from outside to open and close the opening. The diaphragm has an urging member (41) made of ceramic, which is fixed to the opening (252) side of the diaphragm so that the resistance to corrosion of the diaphragm is improved.

U.S. Pat. No. 6,807,984 to Volovets et al. is directed to a valve and a valve assembly are provided that exhibit both highly controlled metering of fluid, as well as a high volume of fluid flow when the valve is in the fully open position. The regulating portion of the valve is provided with channels having different cross-sectional shapes, or channels having different lengths to provide staged flow. The valve is further provided with a fluid boundary element that is movably operably connected to the valve for mounting the valve to the valve body.

U.S. Pat. No. 6,832,628 to Thordarson et al. is directed to an intrinsically safe pneumatically actuated flow controller. A preferred embodiment for the flow controller has a housing assembly defining an inlet port, an outlet port, a pressure signal inlet port, and a main flow path extending between the inlet port and the outlet port. A restriction member is arranged in the main flow path. A first valve assembly and second valve assembly control fluid flow along the main flow path. A first regulator assembly operates the first valve assembly. A pressure signal actuation assembly has an actuation bellows attached to an actuation piston mounted on a flow control piston rod that passes through an isolation plate and is sheathed by an isolation bellows. The flow control piston rod terminates in a flow control piston that engages a second regulator assembly, which operates the second valve assembly based on pressure signals transmitted through the pressure signal inlet to the pressure signal actuation assembly.

International Patent App. Pub. No. WO87/02153 to Piesche is directed to a pressure regulator comprising a high-pressure chamber (2), and an atmospheric pressure chamber (3) having an opening (4) for controlled high-pressure (C), between which a diaphragm (5) is disposed having a sealing disc (6) resiliently movable in relation thereto, said diaphragm (5) selectively closing both an atmospheric pressure input port (8) and a through port (7) between high-pressure chamber (2) and atmospheric pressure chamber (3) in the sealing disc (6), and said sealing disc (6) being pressed towards the diaphragm (5) under the action of at least one spring (9). In order to permit a control of the high-pressure dependent on atmospheric pressure, for example of the boost pressure of a turbo charger for internal combustion engines, the pressure regulator has a bellow (11) responding to changes in the atmospheric pressure (A) for changing the bias of the spring (9) upon changing atmospheric pressure (A). The action of the bellow (11) on the spring bias is expediently adjustable.

The prior art described above teaches a variety of control valves, valve systems, and the like, including a refrigerant control device, a feed water control system for boiler furnaces, a leakproof cylinder, a pressure responsive valve mechanism, a temperature control system, a pressure ratio valve for aircraft air conditioning systems, a hydraulic regulator with hydraulic restoring and stabilizing device, control systems provided with means for remote control of transfer from automatic to manual operation, a differential pressure responsive bellows device, a flow control servo valve, an automatic pressure operated valve, a liquid damped vibration isolator, a fluid pressure responsive control apparatus, a pressure responsive device, a pressure responsive device with overpressure protection, a pressure balanced valve having yieldable seating, a fluid-operated valve, an ambient pressure compensated transmission throttle valve control, a flow control valve with plural diaphragm operator, a fuel emission control system, a pressure reducing regulator, a pressostat, a control valve device, a safety blow-out protection for fluid actuators, a fuel control, a temperature sensor, a combustion and feedwater controller for a flash boiler, an accurate high-flow clean regulator with input-pressure balancing, a multi-axis vibration isolation system, a valve for setting the dampening level of suspension struts, leakage bellows of hydraulic damper protected by oppositely wound coil springs, a control valve, a quick start HEUI system, a fuel pressure regulator with fluidic assist, a balanced fluid pressure regulator, a pressure controlled suspension damper, control valves for a variable displacement compressor, a direct-acting pressure regulator, a control valve and diaphragm for use in the control valve, a high flow high control valve and assembly, variable pressure regulated flow controllers, and a pressure regulator, but does not teach a high pressure actuator regulating valve having a regulating orifice operative between the exterior of a bellows and the space surrounding the working surface of a piston, a U-shaped insert for support of the convolution loop of a rolling diaphragm installed in conjunction with the piston, or a balancing diaphragm assembly cooperating with the actuator assembly to offset the pressure on the inlet side of the valve when closed and so allow a spring biasing assembly of the valve to counteract only the bellows set-point pressure.

Aspects of the present invention fulfill these needs and provide further related advantages as described in the following summary.

SUMMARY OF THE INVENTION

Aspects of the present invention teach certain benefits in construction and use which give rise to the exemplary advantages described below.

An actuator regulating valve apparatus according to aspects of the present invention comprises an actuator assembly operably installed within a valve body assembly, a bellows assembly operably installed adjacent to the actuator assembly, a biasing assembly operably installed on the valve body assembly substantially opposite the bellows assembly and configured to bias the apparatus closed, and a non-compressible liquid filling the apparatus about a bellows of the bellows assembly and the effective working surface of a piston of the actuator assembly and communicating therebetween through an orifice.

A primary objective inherent in the above described apparatus and method of use is to provide advantages not taught by the prior art.

Another objective is to provide such an apparatus wherein the orifice has a through area that is approximately 0.05% to 5% of the effective working area of the piston so as to regulate movement of the valve relative to movement of the bellows.

A further objective is to provide such an apparatus wherein an actuator rolling diaphragm is configured so as to partially cover the piston and to have a convolution loop supported by a U-shaped insert within a groove about the piston.

A still further objective is to provide such an apparatus wherein a balancing diaphragm sub-assembly of the biasing assembly acts on a pushrod of the actuator assembly to produce a force substantially equal and opposite to the pressure in an inlet side of the apparatus.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Features, elements, and aspects of the invention that are referenced by the same numerals in different figures represent the same, equivalent, or similar features, elements, or aspects, in accordance with one or more embodiments.

DETAILED DESCRIPTION OF THE INVENTION

The above described drawing figures illustrate aspects of the invention in at least one of its exemplary embodiments, which are further defined in detail in the following description.

The subject of this patent application is a high pressure actuator regulating valve. While such actuators, and specifically those employing bellows, are known, aspects of the present invention introduce several new innovations that improve the construction and use of such actuator regulating valves. Aspects of the invention relate to the details of a liquid-filled bellows enabling the bellows to withstand higher pressures without compromising performance, a response rate-regulating orifice that effectively meters the pressurization changes within the bellows as they translate to mechanical movement of the actuator mechanism and the valve itself, a pressure balancing diaphragm configured to assist with valve operation and biasing the valve closed, and an actuator rolling diaphragm "backstop" design that enables such a diaphragm to also perform at relatively higher pressures. Those skilled in the art will appreciate that such aspects may be employed alone or in various combinations in addressing a particular context or application for the actuator regulating valve. Thus, it will be appreciated that while the present invention is shown and described in connection with certain exemplary embodiments so as to illustrate such aspects of the invention, and particularly in the context of refrigeration valves, the invention is not so limited. Once again, aspects of the high pressure actuator regulating valve of the present invention may be employed in other relatively high pressure contexts as well and take other forms and employ other materials or mechanical means, now known or later developed, without departing from the spirit and scope of the invention.

Figure 1:
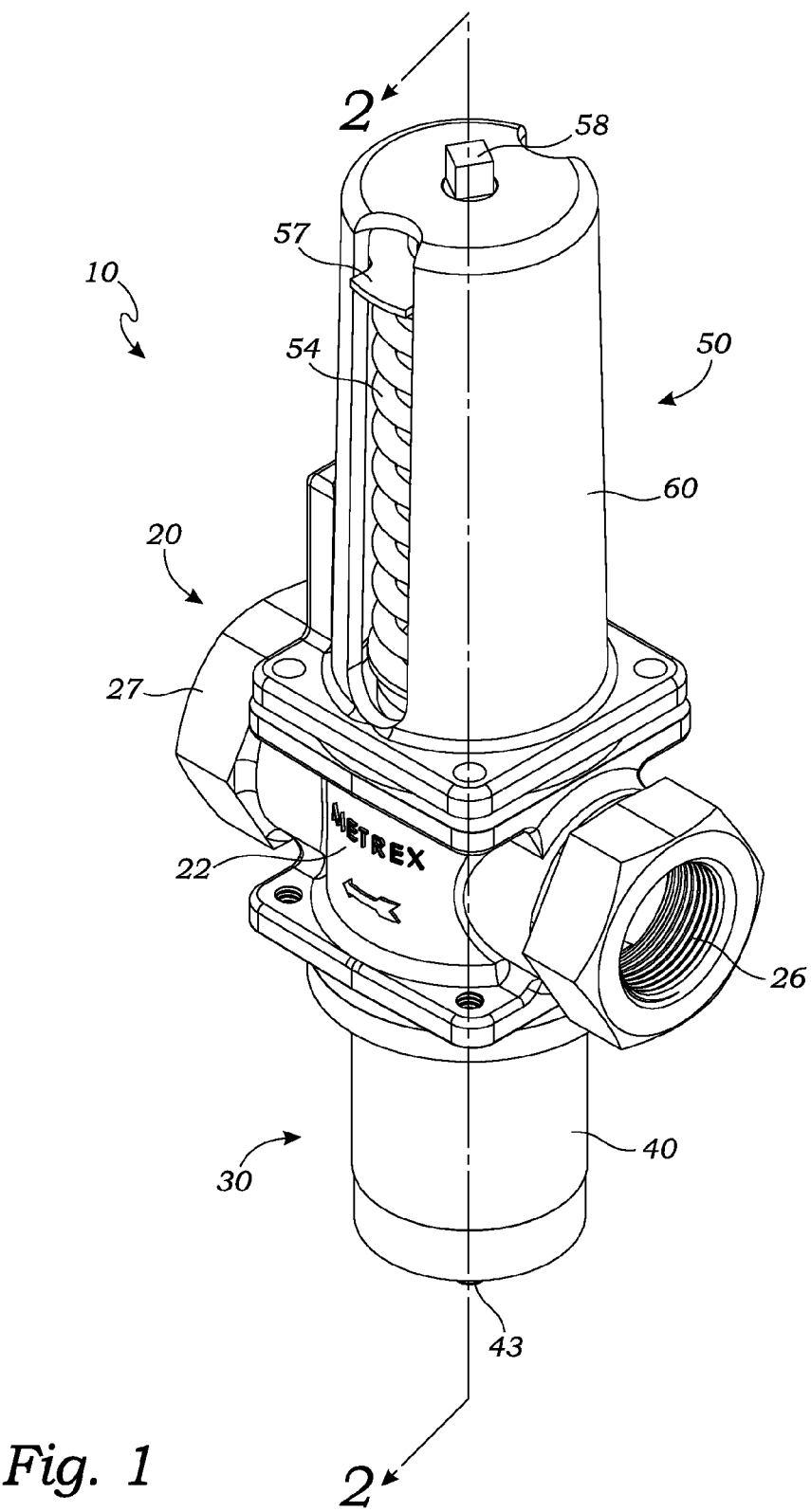
FIG. 1 is a perspective view of an exemplary embodiment of the invention.
Figure 2:
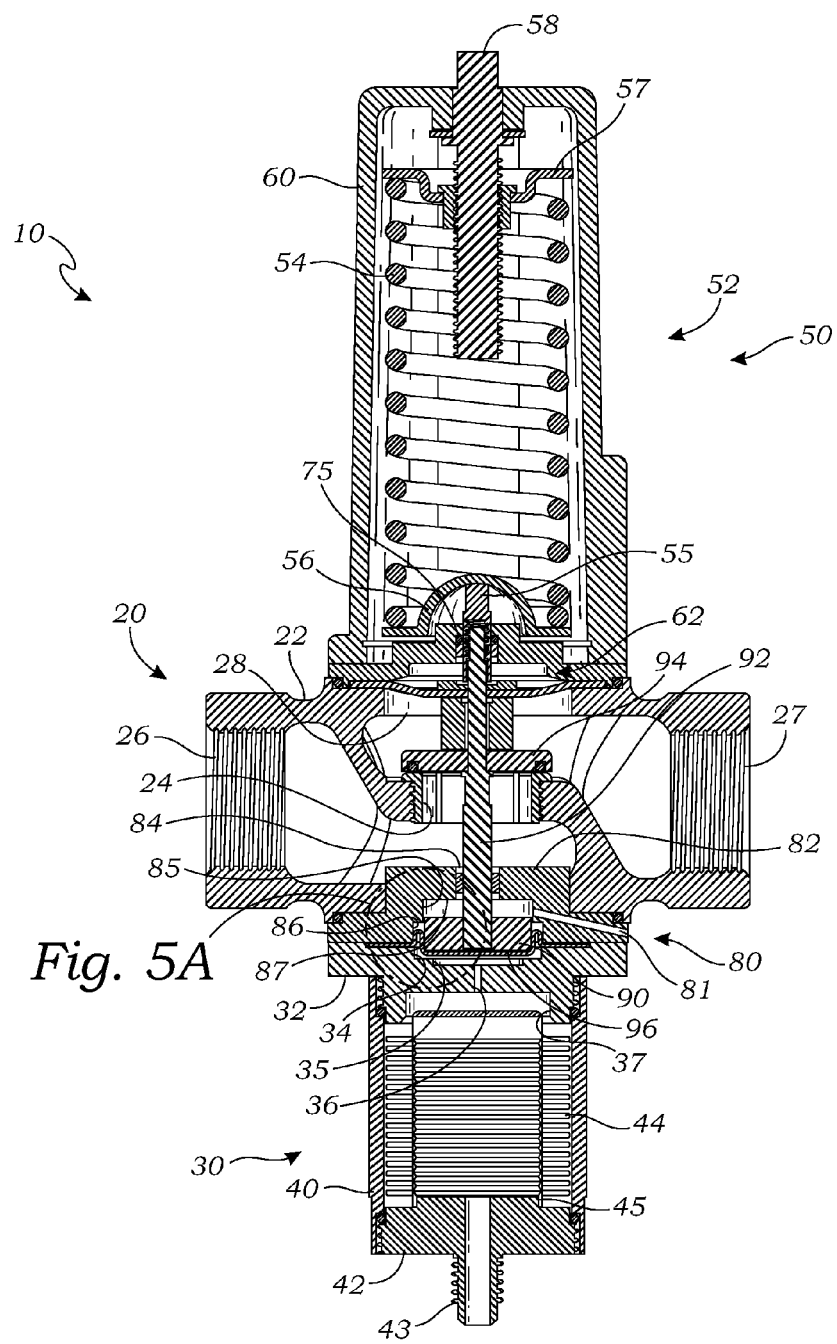
FIG. 2 is an enlarged cross-sectional view thereof taken along line 2-2 of FIG. 1, wherein the valve is in a nominally closed position.
Figure 3:
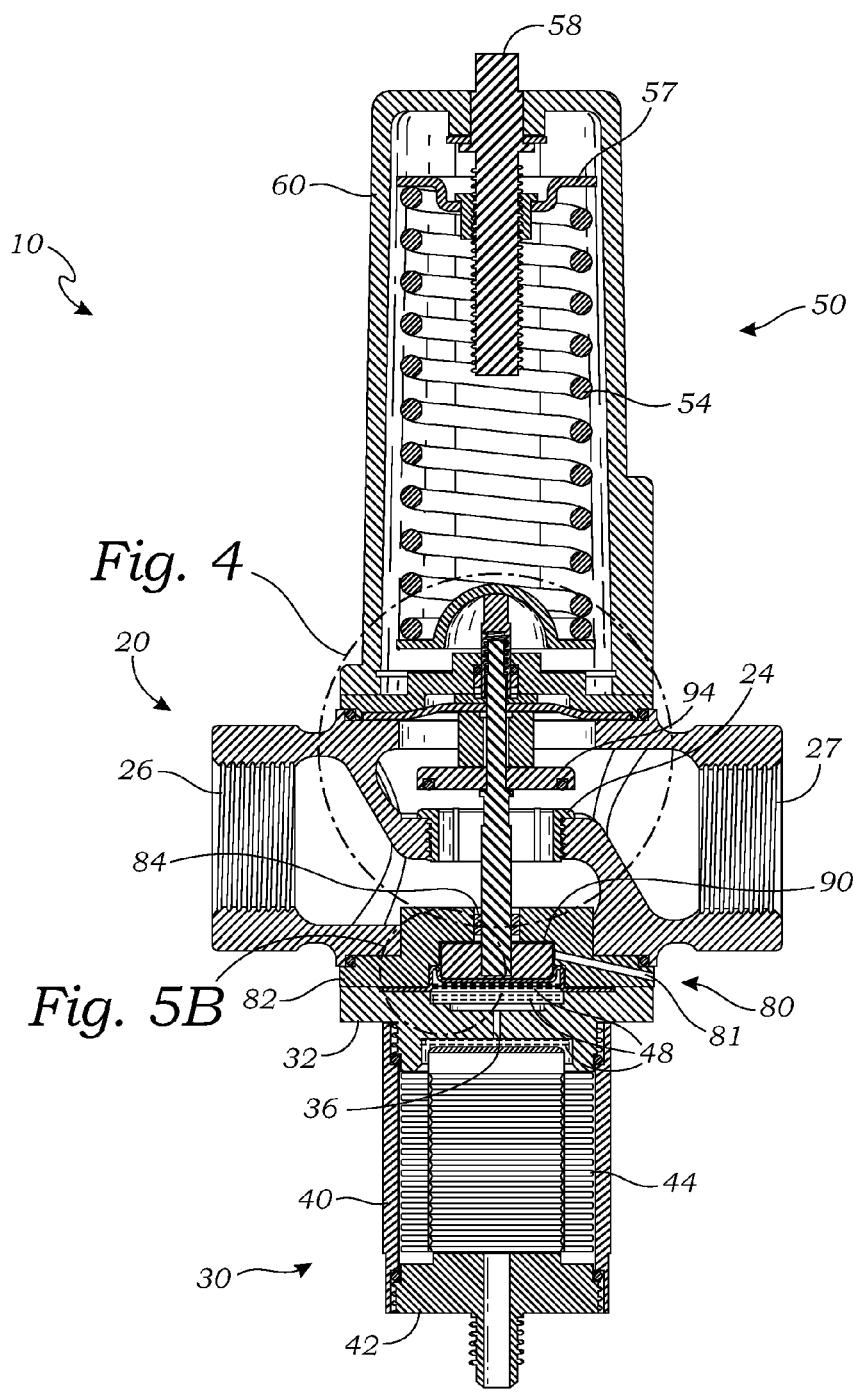
FIG. 3 is an enlarged cross-sectional view thereof analogous to FIG. 2, wherein the valve is in a nominally open position.

Referring first to FIG. 1, there is shown a perspective view of an exemplary high pressure actuator regulating valve 10 including a valve body assembly 20, a bellows assembly 30 installed on one side of the valve body assembly 20 so as to cooperate in opening the valve 10 in response to refrigerant or other fluid pressure, a biasing assembly 50 installed on a side of the valve body assembly 20 opposite the bellows assembly 30 and configured to bias the valve 10 closed, and an actuator assembly 80 (FIGS. 2 and 3) operably installed within the valve body assembly 20 so as to be responsive to both the bellows assembly 30 and the biasing assembly 50 in selectively controlling the position of the valve 10 and the flow of fluid therethrough. Each of these assemblies and their core components and function will be described further below in connection particularly with FIGS. 2 and 3 showing the valve 10 in the nominal closed and open positions, respectively. Once more, those skilled in the art will appreciate that while particular configurations of the valve 10 and its sub-assembly systems are disclosed for the refrigeration context, other such configurations are possible without departing from the spirit and scope of the invention, such that many of the details shown and described herein are to be understood as being merely illustrative or for context.

Turning now to FIG. 2, there is shown an enlarged cross-sectional view of the high pressure actuator regulating valve 10 of FIG. 1 taken along line 2-2. Here, the valve 10 is shown in a first operational position wherein the valve 10 is nominally closed, while in FIG. 3 a similar cross-sectional view is shown wherein the valve 10 is in a second nominally open position, the operation of which in either position and in moving from one to the other will be further appreciated from the following discussion. In a bit more detail, then, regarding the overall construction of the valve 10, the valve body assembly 20 generally comprises a hollow valve body 22 and a substantially centrally disposed therein valve seat 24. In the exemplary embodiment, the valve seat 24, and more particularly the axis of its opening therethrough, is oriented substantially perpendicular to the direction of the cross flow through the valve 10. Communicating with opposite ends of the valve seat 24 and establishing the cross-flow path through the valve body 22 are opposite threaded connectors 26, 27, here configured as female NPT connectors, though again any such connectors as desired for a particular use, whether now known or later developed, may be employed in the valve 10. In the exemplary embodiment the valve body 22 is formed of bronze as through casting and a secondary machining and/or finishing operation. Other components may be formed of nickel alloy, such as the valve seat 24, through any appropriate manufacturing method, though any such material and method of manufacture now known or later developed as being suitable to a particular valve context may be employed.

The actuator assembly 80 is operably installed within the valve body assembly 20 by installing on the valve body 22 on a lower side substantially adjacent the bellows assembly 30 a piston travel stop seating member 82 having a first piston travel stop seating member bore 84 formed substantially centrally therein for the sliding passage therethrough of a pushrod 92 installed on a piston 90 operable within a second piston travel stop seating member bore 85 formed below, concentric with, and larger than the first piston travel stop seating member bore 84, the top surface of the second piston travel stop seating member bore 85 defining a piston travel stop 87, more about which is said below, the piston 90 being further operable within a third piston travel stop seating member bore 86 formed below, concentric with, and larger than the second piston travel stop seating member bore 85, the piston itself having an outside diameter substantially equivalent to the diameter of the second piston travel stop seating member bore 85 and smaller than the diameter of the third piston travel stop seating member bore 86, the function of the clearance between which and the piston 90 being appreciated with reference particularly to FIGS. 5A-C and 6A-C as discussed below. The result is a downwardly-opening three-stepped bore formed in the piston travel stop seating member 82 so as to operably receive the piston 90 and pushrod 92 sub-assembly. A passage 81 is formed in the piston travel stop seating member 82 so as to communicate between the second piston travel stop seating member bore 85 and atmosphere and thereby prevent unwanted pressure or vacuum build-up on the back, or top, side of the piston 90, or the side of the piston 90 opposite the bellows assembly 30. Wherever components are to be installed in a substantially sealed arrangement, such as between the valve body 22 and the piston travel stop seating member 82, o-rings such as made of molded Buna-N and known and used in the art may be employed as appropriate between mating surfaces. Distal of the piston 90 or partway up the pushrod 92 there is installed thereon a valve cap 94 configured for seating over the valve seat 24 as the pushrod 92 passes therethrough in selectively closing the valve 10. Substantially at the end of the pushrod 92 opposite the piston 90 there are installed elements of the biasing assembly 50 for mechanically engaging the pushrod 92 and biasing the pushrod 92 down, thereby biasing the valve 10 closed, again, through the seating of the actuator's valve cap 94 against the valve seat 24.

Figure 4:
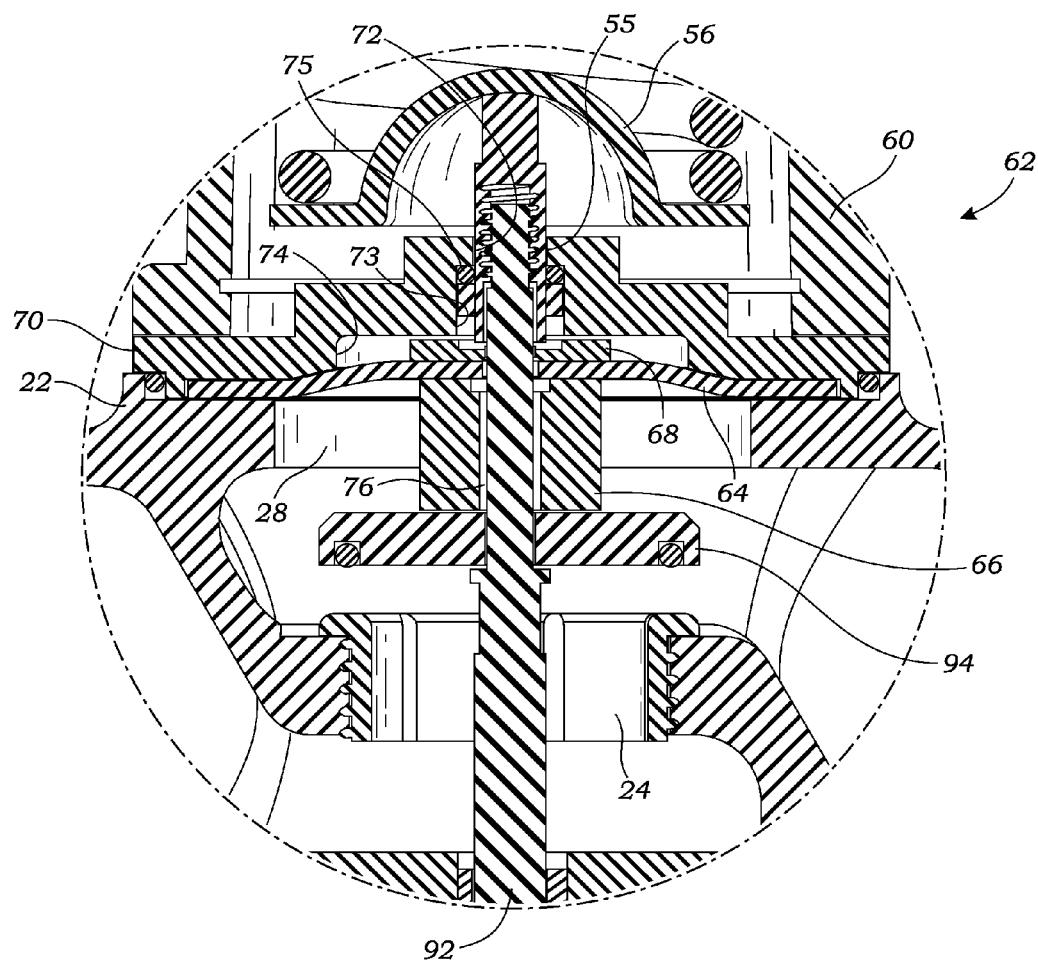
FIG. 4 is an enlarged partial cross-sectional view thereof taken from circle "FIG. 4" of FIG. 3.

With continued reference to FIGS. 2 and 3, the biasing assembly 50 of the high pressure actuator regulating valve 10 is shown as comprising a spring sub-assembly 52 and a balancing diaphragm sub-assembly 62. First, the spring sub-assembly 52 comprises a spring 54 mounted in compression between a first spring plate 56 coupled to the distal end of the pushrod 92 and a second spring plate 57 threadably engaging an adjustment screw 58 rotatably installed within a housing 60 itself installed on the valve body assembly 20 substantially opposite the bellows assembly 30 so as to at least partially encase the spring 54. As will be appreciated, in a manner generally known in the art, the spring force, or the degree to which the spring 54 is compressed and thereby exerts a downward biasing force on the first spring plate 56 and thus the pushrod 92 and valve cap 94 so as to bias the valve 10 closed, may be adjusted by selectively turning, or tightening or loosening, the adjustment screw 58, thereby moving the second spring plate 57 down or up axially. The balancing diaphragm sub-assembly 62 that is also part of the biasing assembly 50 is further described below in connection with the enlarged partial cross-sectional view of FIG. 4 depicting the valve 10 in its nominally open position as also shown in FIG. 3.

To complete the overall construction of the exemplary high pressure actuator regulating valve 10, there is again installed a bellows assembly 30 on the valve body assembly 20 substantially opposite the biasing assembly 50 and substantially adjacent to the piston travel stop seating member 82 of the actuator assembly 80. As shown in FIGS. 2 and 3, the bellows assembly 30 generally comprises a bellows assembly base 32 installed on the piston travel stop seating member 82 such that an upwardly-opening first bellows assembly base bore 34 is substantially concentric with the third piston travel stop seating member bore 86. The bellows assembly base 32 may be further formed with an upwardly-opening second bellows assembly base bore 35 having a diameter smaller than that of the first bellows assembly base bore 34 and then with a through-hole or orifice 36 having a significantly smaller diameter than that of the first and/or second bellows assembly base bores 34, 35 and formed so as to communicate between which and a downwardly-opening third bellows assembly base bore 37, more about which is said below in connection with describing the high pressure actuator regulating valve 10 in use. Notably, sandwiched or trapped substantially about its perimeter between the bellows assembly base 32 and the piston travel stop seating member 82 is an actuator rolling diaphragm 96 so as to partially engage the actuator piston 90, the construction and function of which diaphragm 96 is also best appreciated with reference particularly to FIGS. 5A-C and 6A-C as discussed below. Installed proximally on the bellows assembly base 32 is a bellows assembly wall 40 capped at its proximal end by a bellows assembly end cap 42 having formed therein a port 43 for communication therethrough of a fluid such as refrigerant as supplied by and flowing in a refrigeration system as is known in the art and to which, for example, the high pressure actuator regulating valve 10 is fluidly connected. On the distal or upwardly-facing side of the bellows assembly end cap 42 there is sealably installed a bellows 44, as by being mounted on a boss 45 extending upwardly from the bellows assembly end cap 42. As such, it will be appreciated that the refrigerant or other fluid flowing in a line (not shown) connected to the end cap port 43 is thereby in fluid communication with the interior space of the bellows 44, the relative pressure of such fluid having a tendency to cause the bellows 44 to expand or contract. Thus configured, the high pressure actuator regulating valve 10 is capable of being installed in fluid communication within a refrigeration or other system and selectively opening against the biasing effects of the biasing assembly 50 through the actuation effect of the bellows 44 and the attendant movement of the actuation assembly 80 as described further herein. In such a valve 10, the bellows 44 may be formed of brass, nickel alloy, stainless steel or other such material, having a particular wall thickness, and by a fabrication method such as a metal working and welding process, any of which as now known or later developed in the art appropriate for a particular bellows design and valve application. Those skilled in the art will appreciate once more that while a particular construction of the valve 10 is shown and described, the invention is not so limited, but may instead take other functional forms and employ other materials now known or later developed without departing from the spirit and scope of the invention.

With reference again to FIG. 2, there is once again shown in cross-section the high pressure actuator regulating valve 10 according to aspects of the present invention in a nominally closed position. In such a position, it will be appreciated that the biasing effects of the biasing assembly 50, and particularly the spring 54, are sufficient to push the pushrod 92 down and so cause the valve cap 94 to sealably seat on the valve seat 24 of the valve body 22, thereby closing the valve 10 and not allowing any flow therethrough from the inlet connector 26 to the outlet connector 27. It will be further appreciated that the effective biasing force of the spring 54 as adjusted by the adjustment screw 58 may be set so as to essentially counteract or offset the internal spring rate of the bellows 44 itself and any nominal refrigerant or other fluid pressure that is desired in the system as acting on the underside of the bellows 44. As such, so long as the fluid pressure remains at or below that effective set-point, the valve 10 will remain closed as biased by the biasing assembly 50, and the spring 54 particularly.

Turning, then, to FIG. 3, there is shown in cross-section the high pressure actuator regulating valve 10 now in a nominally open position. Here, it will be appreciated that now the pressure of the fluid inside the bellows 44 has increased and is effectively sufficient to overcome the downwardly-biasing effects of the biasing assembly 50 on the actuator assembly 80 and lift the valve cap 94 off of the valve seat 24 and so open the valve 10 and allow cross-flow therethrough from the inlet connector 26 to the outlet connector 27 of a fluid such as water or other fluid to be selectively flowed as part of the refrigeration or other system in which the valve 10 is operational. In a bit more detail, in the exemplary embodiment, the space surrounding the outside of the bellows 44, or the space bounded by the outer surface of the bellows 44, the bellows assembly base 32, the bellows assembly wall 40, and the bellows assembly end cap 42, is filled with a substantially non-compressible liquid 48 (shown as dashed lines in FIG. 3 but not in FIG. 2 for clarity) such as mineral oil, which is also an acceptable contaminant for a refrigeration system if there is a leak, such as at a bellows weld, whereby the mineral oil could pass into and be mixed with the refrigerant itself. This same non-compressible liquid 48 also fills the third bellows assembly base bore 37, the orifice 36, the first and second bellows assembly base bores 34, 35, and at least a portion of the third piston travel stop seating member bore 86 (FIG. 2), such that the liquid 48 substantially completely fills the spaces surrounding both the bellows 44 and the effective working surfaces of the piston 90 and communicates therebetween through the orifice 36. Thus, when the pressure of the refrigerant or other fluid in communication with the inside of the bellows 44 increases and the bellows 44 expands, translation of the movement of the bellows 44 to movement of the actuator piston 90 is effectively accomplished through the non-compressible liquid 48 filling the space between the bellows 44 and the piston 90, whereby the resulting "mechanical" arrangement is that effectively the bellows 44 expands against the biasing assembly 50, and the spring 54 particularly, through the non-compressible liquid 48 acting on the piston 90 and thus the pushrod 92. More specifically, the actuator rolling diaphragm 96 (FIGS. 5A-C and 6A-C) installed between the bellows assembly base 32 and the piston travel stop seating member 82 and encapsulating the bottom side of the piston 90 serves to seal that portion of the actuator assembly 80 and thereby becomes the surface against which the liquid 48 works when "pushed" by the expanding bellows 44. Again, more about the specifics of the actuator rolling diaphragm 96 is said below in conjunction with the detailed views of FIGS. 5A-C and 6A-C. Regarding the orifice 36 through which the non-compressible liquid 48 passes between the spaces surrounding the bellows 44 and the piston 90, it will be appreciated that the orifice 36 serves as a mechanism for throttling down or regulating the action of the bellows 44 so as to have the actuator assembly 80 not respond too quickly to pressure changes. In other words, the orifice 36 provides resistance to rapid pressure changes and limits "chatter" or unwanted vibration of the actuator assembly 80 by effectively slowing down the valve response rate. The diameter of the orifice 36 may be selected depending on the desired degree of reduced response rate. In an exemplary embodiment, the orifice diameter can be chosen to provide an orifice cross-sectional (through) area of between 0.1% to 1% of the effective working area of the actuator rolling diaphragm 96, though a range of 0.05% to 5% would be adequate in the exemplary design. The actuator rolling diaphragm effective working area is substantially determined by the area of the arithmetic average diameter of the diameters of the second and third bores 85, 86 of the piston travel stop seating member 82, which also substantially approximates the effective working surface or area of the piston, or that part of the piston's surface that is effectively acted on by the non-compressible liquid 48 partially surrounding the piston 90, whether directly or through the diaphragm 96 partially covering or encasing the piston 90. Whereas, for the orifice cross-sectional or through area, while in the exemplary embodiment this is effectively the area of the single circular opening defined by the orifice 36, it will be appreciated that the same relative area relationship between the orifice 36 and the effective area of the actuator rolling diaphragm 96 and the resulting response rate benefits can also be achieved by multiple relatively smaller holes, a mesh or multiple path "sponge metal" of small screen, or any other such opening(s) or aperture(s) formed or configured between the relatively larger volumetric spaces surrounding the bellows 44 and the piston 90 and actuator rolling diaphragm 96, such that the structure of the single round orifice 36 is to be understood as merely illustrative of aspects and principles of the present invention. Accordingly, the word "orifice" as used herein is expressly not to be limited to a single bore or hole. Moreover, those skilled in the art will further appreciate that other absolute or relative sizes of the orifice 36 or other such opening(s) and its(their) effective area may be employed in various other valve designs according to aspects of the present invention in controlling the response rate of the actuator assembly 80 relative to movement of the bellows 44, such that even the 0.05% to 5% range and any particular absolute or relative size of the orifice 36 is again to be understood as merely illustrative. Relatedly, it will be appreciated that the liquid-filled bellows 44 of the exemplary valve 10 allows for operation at relatively higher refrigerant or other fluid pressures without compromising sensitivity or performance of the valve 10 as by going with thicker-walled bellows. Furthermore, the inverted orientation of the bellows 44 whereby the refrigerant or other system fluid being regulated acts on the inside of the bellows 44 and so internally pressurizes the bellows 44 from the lower mouth end is advantageous, in that the bellows 44 is less prone to "squirming" or getting "out of column" when required to impart force. Also with this configuration the bellows 44 is protected against over-travel both by the actuator piston 90 mechanically stopping against the piston travel stop 87 defined by the top surface of the second piston travel stop seating member bore 85 (FIGS. 2 and 3), thereby preventing any further movement of the bellows through the non-compressible liquid 48 effectively mechanically coupling the piston 90 and bellows 44, and further by the distal end of the bellows 44 potentially seating within the third bellows assembly base bore 37 should, for example, the actuator rolling diaphragm 96 fail. Accordingly, those skilled in the art will appreciate that the bellows assembly 30 as shown and described herein has a number of advantages over prior art regulating valves in construction and use. It is noted that, though not shown, a hole as provided, for example, in the bellows assembly end cap 42 and then subsequently plugged may be employed in inserting the non-compressible liquid 48 as through a vacuum-filling operation.

Referring now to the enlarged partial cross-sectional view of FIG. 4, the balancing diaphragm sub-assembly 62 of the biasing assembly 50 (FIGS. 1-3), which plays a further role in balancing or equalizing the pressures within the valve 10 during operation, is shown as generally comprising a balancing diaphragm 64 mounted on the pushrod 92 essentially just below the connection of the pushrod 92 to the first spring plate 56 of the biasing assembly 50 (FIGS. 2 and 3). The balancing diaphragm 64 is pinched between a first balancing diaphragm ring 66 concentrically installed on the pushrod 92 below the balancing diaphragm 64 and seated atop the valve cap 94, and a second balancing diaphragm ring 68 installed above the balancing diaphragm 64 and secured in place as by a threaded first spring plate connector 55. As such, the balancing diaphragm 64 is fixed on the pushrod 92 and configured to extended substantially radially outwardly therefrom so as to span an opening 28 formed in the valve body 22 substantially in-line with the valve seat 24 and substantially opposite the installation of the piston travel stop seating member 82 (FIGS. 2 and 3) on the side of the valve body 22 adjacent the bellows assembly 30 (FIGS. 1-3), whereby the bellows assembly 30, the actuator assembly 80, and the biasing assembly 50, and the balancing diaphragm sub-assembly 62, particularly, are substantially axially aligned so as to operate as the valve 10 opens and closes through the axial movement of the piston 90 (FIGS. 2 and 3) and pushrod 92. The perimeter edge of the balancing diaphragm 64 is pinched between the valve body 22 at the mouth of the opening 28 and a balancing diaphragm retaining cap 70 installed thereover substantially between the valve body 22 and the spring sub-assembly housing 60. The balancing diaphragm retaining cap 70 thus cooperates in installing the balancing diaphragm 64 suspended within the opening 28, while the flexibility of the diaphragm 64, such as constructed of a Buna-N material, still allows for the axial movement of the piston 90 and pushrod 92 though mounted on the pushrod 92 as described above and shown in FIGS. 2-4. The balancing diaphragm retaining cap 70 is formed with a first balancing diaphragm retaining cap bore 72 configured to slidably receive the pushrod 92, with a downwardly-opening second balancing diaphragm retaining cap bore 73 below and having a slightly larger diameter than that of the first balancing diaphragm retaining cap bore 72 and having installed therein a sealing element 75 such as an o-ring so as to substantially seal about the pushrod 92 or the first spring plate connector 55 threadably installed thereon, and with a downwardly-opening third balancing diaphragm retaining cap bore 74 having an inside diameter larger than that of both the first and second balancing diaphragm retaining cap bores 72, 73 and the outside diameter of the second balancing diaphragm ring 68 so as to form a space behind the balancing diaphragm 64, or on the side of the balancing diaphragm 64 opposite the valve cap 94, valve seat 24, and the fluid flow path through the valve 10. In communication with the space, or communicating between the space above the balancing diaphragm 64 and the positive or inlet side of the valve 10 when the valve is closed, or when the valve cap 94 is seated on the valve seat 24, are channels 76 in the form of grooves or reliefs formed within the valve cap 94, the first balancing diaphragm ring 66, the balancing diaphragm 64, and the second balancing diaphragm ring 68, essentially substantially axially along each between an interior surface thereof and the outer surface of the pushrod 92. In use, then, when the valve 10 is closed as by the valve cap 94 being seated on the valve seat 24, as again shown in FIG. 2, it will be appreciated that as positive pressure builds on the inlet side of the valve 10, that same fluid head or pressure passes along the channels 76 and exits through the second balancing diaphragm ring 68 into the space above the balancing diaphragm 64. Accordingly, the pressure above the balancing diaphragm 64 will come to substantially equal the pressure on the positive or inlet side of the valve 10, thereby exerting through the balancing diaphragm 64 and its installation on the pushrod 92 a downward force on the valve cap 94 substantially equal and opposite to the upward force exerted on the valve cap 94 by the fluid in the positive or inlet side of the valve 10. As such, it will be further appreciated that the biasing assembly 50 (FIGS. 2 and 3), and the spring sub-assembly 52 and spring 54, specifically, need not exert a biasing force equivalent to both the fluid pressure on the inlet side of the valve 10 and the refrigerant or other fluid pressure acting on the bellows 44 of the bellows assembly 30 and thus the piston 90 and pushrod 92 as above-described in order to keep the valve 10 positively closed; rather, with the balancing diaphragm sub-assembly 62 substantially offsetting the pressure on the inlet side of the valve 10 or the forces exerted thereby on the valve cap 94, the spring sub-assembly 52 of the biasing assembly 50 need only counteract the set-point pressure of the bellows assembly 30 as dictated by the desired refrigerant pressure, thereby simplifying the biasing assembly 50 and any adjustments thereto depending on the context and reducing cost and potential failure modes by employing a spring 54 with a relatively lower spring rate.

Figure 5A:
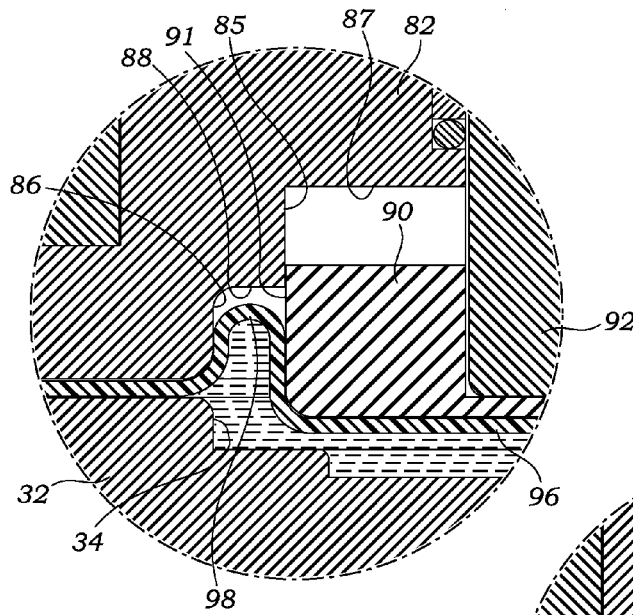
FIGS. 5A-5C are enlarged partial cross-sectional schematic views thereof taken from circle "FIG. 5A" of FIG. 2 and circle "FIG. 5B" of FIG. 3, wherein the valve actuator is depicted as being under three operative conditions.
Figure 5B:
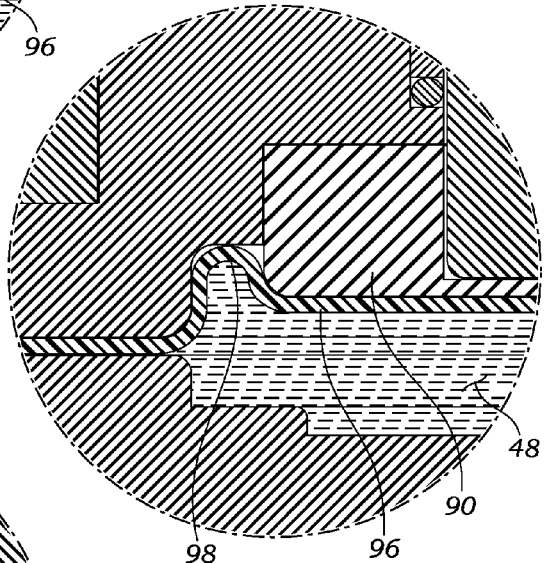
Figure 5C:
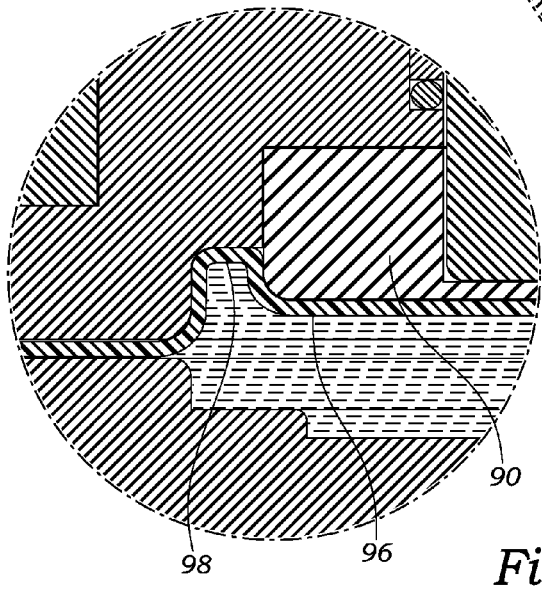

Turning now to FIGS. 5A-5C, there are shown enlarged partial cross-sectional schematic views of one side or half of the piston 90 and actuator rolling diaphragm 96 so as to show the actuation assembly 80 (FIGS. 2 and 3) in three operative positions: (1) with the valve 10 closed (FIG. 5A); (2) with the valve 10 open effectively at just beyond the bellows set-point pressure (FIG. 5B); and (3) with the valve 10 open and at proof pressure (FIG. 5C). Prefatorily, it is noted that for consistency with FIGS. 1-4, the piston 90 and pushrod 92 are still referred to as shifting down when the valve 10 is closed and up when the valve 10 is opened, again, as in FIGS. 2 and 3. Further, regarding the use of a rolling diaphragm generally, such a diaphragm design uniquely offers an excellent combination of the following properties: inherently high working and burst pressure characteristics; relatively low or negligible drag during movement; relatively constant effective area over entire stroke range; relatively long stroke-to-diameter ratio; and relatively long cycle life. Such attributes make rolling diaphragms particularly useful when designing leak-tight, high-sensitivity, pressure-actuated mechanical and electro-mechanical devices that must operate at relatively significant pressures and strokes. By comparison, the use of more traditional flat or formed diaphragms, o-rings, packings and other sealing methodologies are either more limited in pressure and/or stroke, exhibit undesirable change in effective area, or act to create sliding friction that may cause unwanted binding or drag that could impair the operation of a particular device. Whereas, again, a rolling diaphragm is a reliable and useful leak-tight, low-friction device that will provide a force output proportional to the pressure or differential pressure applied. However, even design challenges and failures in rolling diaphragms can be presented in certain higher pressure applications such as refrigeration systems utilizing a refrigerant like R410A. Moreover, other sealing methodologies now known or later developed may suit a particular even relatively high-pressure context as well or better than a rolling diaphragm, such that those skilled in the art should appreciate that the invention is generally not limited to a rolling diaphragm, though aspects of the present invention particularly as they relate to convolution support are addressed to rolling diaphragms or substantially analogous sealing methodologies. Again, while many such devices are designed for and can accommodate proof pressures of on the order of 1.5× design pressure, some rating agencies or specifications require a much higher safety factor, which higher proof pressure requirement may be as much as 5× over design pressure. Designing for such a proof pressure while keeping costs within a competitive price range is a challenge that is met by the high pressure actuator design of the present invention. By way of further background on rolling diaphragms, typical designs incorporate a formed fabric scrim with a conformal elastomer molded on one or both sides. The completed diaphragm is designed or shaped for use with specifically-sized hardware components generally consisting of a cylinder that supports the outside flange portion of the diaphragm and a piston that supports the central region or "head" of the diaphragm. Typically, the cylinder and piston walls are parallel or nearly parallel to each other. In operation, the piston can move freely through a range of travel with pressure or pressure differential applied against the pressure side of the diaphragm. The limits of the range of travel are determined by the length of the molded diaphragm inner and outer sidewalls that can stay in contact with the cylinder and piston allowing a full 180-degree convolution to form in the diaphragm between the piston and cylinder. When excursion above or below these travel limits occurs the diaphragm is described as being "out of convolution." When this occurs, the stress on the diaphragm increases significantly, depending on the amount that the diaphragm is out of convolution. In addition, the effective area, which is constant while the diaphragm is in full convolution, will change, either increasing if the upward stroke limit is exceeded or decreasing if the downward stroke limit is exceeded. Rolling diaphragms are further typically designed to minimize the clearance distance between the cylinder and piston, while still allowing adequate room for the diaphragm inner and outer side walls and for the convolution between them, which minimized clearance distance acts to minimize the stress on the diaphragm for a given pressure. Such a design generally allows relatively high pressures to act on the diaphragm without overstressing the diaphragm or causing failure.

Specifically, the stress on the diaphragm, which is carried by the fabric portion, is proportional to the applied pressure and the convolution width. This stress occurs in the diaphragm sidewalls and also in the unsupported loop forming the convolution between the cylinder and piston. The stress value and the strength of the reinforcing fabric determine the working pressure and burst pressure values for a particular diaphragm design. For example, the burst or failure pressure of the exemplary actuator rolling diaphragm 96 employed in the present invention is approximately 1,500 psi for the situation where the bottom of the convolution loop 98 is unsupported at high or burst pressure loading. Within the operating pressures and movements of the convolution as the diaphragm travels through its stroke range, conventional thinking is that the convolution must be able to freely move up and down without any restriction or interference. This is generally the intended operation for a particular rolling diaphragm design: if the bottom of the unsupported convolution comes into restrictive contact or "bottoms out" the pressure vs. force relationship (effective area×pressure) and diaphragm travel are adversely affected. With this as background, attention is now turned to the improved high pressure actuator regulating valve design of the present invention, and particularly the innovations relating to support of the convolution loop 98 of the actuator rolling diaphragm 96 so as to accommodate relatively higher pressures for a given diaphragm in a manner not previously practiced in the art.

First, then, as shown in FIG. 5A, the valve 10 is in a nominally closed position corresponding to FIG. 2. Accordingly, as shown in FIG. 2, the pushrod 92 has been shifted down under the influence of the biasing assembly 50, and the spring 54, particularly, such that the valve cap 94 is seated against the valve seat 24, as an effective mechanical stop for the actuator assembly 80 moving in that direction, and the piston 90 is thus at an intermediate position suspended within the second piston travel stop seating member bore 85 out of contact with the piston travel stop 87. In this position, as best shown in FIG. 5A, the actuator rolling diaphragm 96 adjacent the piston 90 has a loop portion 98 that is suspended within an annular groove 88 about the piston 90 and effectively defined by the space between the piston sidewall 91 and the third piston travel stop seating member bore 86. Turning to FIG. 5B, as the piston 90 and actuator rolling diaphragm 96 are under increasing pressure from the non-compressible liquid 48 based on expansion of the bellows 44 under commensurate increasing pressure of the refrigerant or other fluid flowing in the system in which the valve 10 is installed (FIGS. 2 and 3), eventually a pressure is reached in the bellows 44 and so acting on the piston 90 as to shift the piston 90 up against the resistance of the biasing assembly 50 until the piston 90 seats against the piston travel stop 87 (FIGS. 2 and 3), thereby opening the valve 10 as shown in FIG. 3, with the valve cap 94 unseated from the valve seat 24. In such a position and state of the valve 10, with the piston 90 having traveled up in the second piston travel stop seating member bore 85, or, nominally, within the cylinder, the actuator rolling diaphragm 96 as subjected to the pressure exerted on it by the surrounding liquid 48 contracts and the convolution loop 98 shortens as the annular groove 88 (FIG. 5A) effectively becomes more shallow. Then, as shown in FIG. 5C, as the pressure on the piston 90 and actuator rolling diaphragm 96 further increases beyond the bellows set-point pressure for valve actuation and toward a proof pressure some multiple over the bellows set-point pressure, while the piston 90 will not move any further, having already bottomed against the piston travel stop 87 (FIG. 5A), the diaphragm 96 will continue to deform and, specifically, the convolution loop 98 will be squeezed into the bottom of the annular groove 88 (FIG. 5A), which groove effectively becomes a mechanical "backstop" support for the diaphragm loop 98, thereby allowing the diaphragm to withstand higher pressures than it would otherwise be able to, or would be able to if the loop 98 remained unsupported floating within a relatively larger or deeper groove. Preferably, contact of the loop 98 against the bottom of the annular groove 88 occurs only after the diaphragm 96 has completed its normal range of travel at design pressure so that the constant pressure versus stroke relationship is not affected. In the exemplary embodiment and context, the piston 90 hits its travel limit hard stop at about 400 psi, such that further pressurization causes the convolution loop 98 to continue to move due to stretching of the diaphragm 96, even though there is again no further travel of the actuator mechanism itself. This continues until the pressure reaches approximately 600 psi for an annular groove depth of approximately 0.17 inch or approximately 1,000 psi for an annular groove depth of approximately 0.19 inch in the exemplary embodiment, as measured from the lower surface of the piston travel stop seating member 82, or effectively the depth of the third piston travel stop seating member bore 86, at which point under either scenario the convolution loop 98 would essentially just come into contact with the bottom of the annular groove 88, as shown in FIG. 5B, such that any further pressurization beyond those 600 or 1,000 psi thresholds would begin to squeeze the loop 98 into the bottom of the annular groove 88 as above-described and as shown in FIG. 5C once the actuator has reached proof pressure, or there approximately 3,250 psi or five times the design pressure of 650 psi in the illustrative context of operating the valve 10 within a refrigeration system using refrigerant R410A. In fact, testing has confirmed that such a design as shown in FIGS. 5A-5C can withstand proof pressures of higher than 4,200 psi without diaphragm failure, or roughly three times the failure pressure in the case of the same diaphragm with an unsupported convolution. With continued reference to FIGS. 5A-5C, the outside wall 91 of the piston 90 is depicted as essentially having a net fit with the inside surface of the second piston travel stop seating member bore 85, or the cylinder wall, which in reality may be a clearance ranging from on the order of 0.001" to 0.020". It will be appreciated based on the foregoing and the pressures the diaphragm 96, and the convolution loop 98, specifically, may see that by limiting the clearance or gap between the piston 90 and cylinder, or bore 85, or the extent to which the hardware design can be configured such that the diaphragm 96 can come into contact with and be supported by a relatively smooth and voidless surface particularly under relatively high pressure, tensile stress on the diaphragm would essentially no longer increase with pressure. As such, the only remaining stress due to high pressure would be bearing stress, which of itself is not a concern for promotion of a hole, breach or other failure of the diaphragm 96. Thus, the details of design that are to be attended to include management of the surfaces that the diaphragm 96 comes into contact with during use. Relatedly and specifically, a design clearance gap, for instance, between the cylinder, or the second piston travel stop seating member bore 85, and the piston 90 can create a point at which the pressurized and otherwise supported convolution loop 98 may fail due to its tendency to try to extrude through such a gap. However, the bottom of the unsupported convolution loop 98 coming into contact with the backstop step or the bottom of the groove 88 as the pressure begins to exceed the set-point pressure and trend higher picks up an additional point of support. As such, instead of the stress in the convolution loop 98 being proportional to pressure times the full unsupported convolution width "C", the new unsupported convolution width is reduced to C×cos 45° or 0.707×C, an effective reduction in contribution stress of 29%. Additional stretching with increasing pressure allows the convolution loop 98 to pick up more support from the backstop step or groove 88 making the unsupported width and its contribution to stress even smaller. Moreover, and still related to management of the surfaces the rolling diaphragm 96 comes in contact with during use, it is also shown to provide corner breaks where possible on the piston 90 and piston travel stop seating member 82 as a way to further mitigate against the development of any stress points in the rolling diaphragm 96.

Figure 6A:
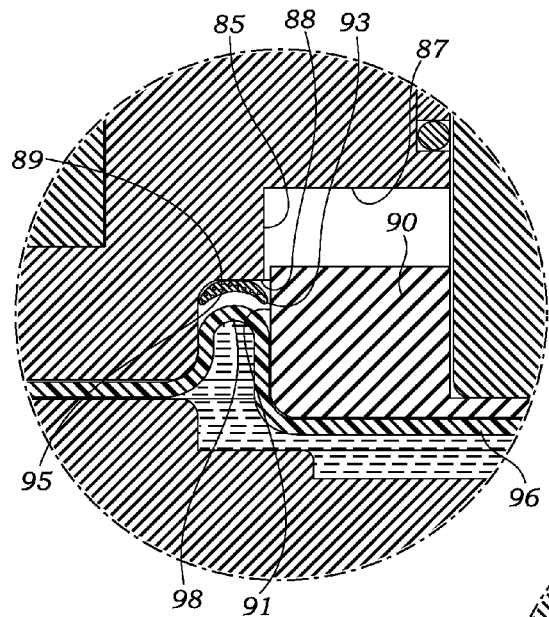
FIGS. 6A-6C are enlarged partial cross-sectional schematic views of an alternative embodiment thereof analogous to FIGS. 5A-5C.
Figure 6B:
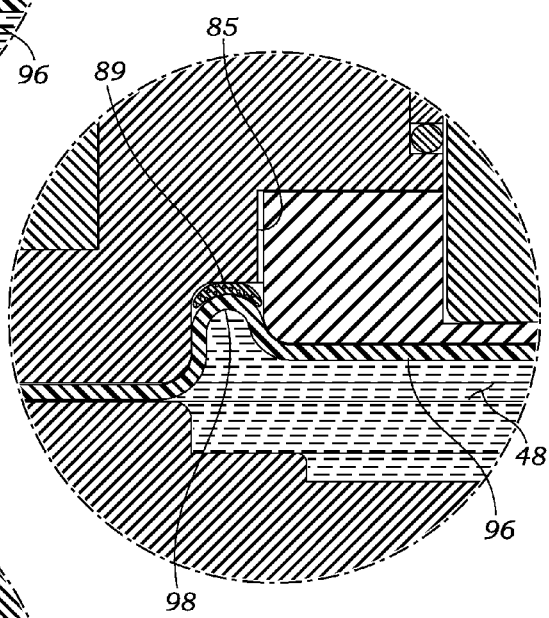
Figure 6C:
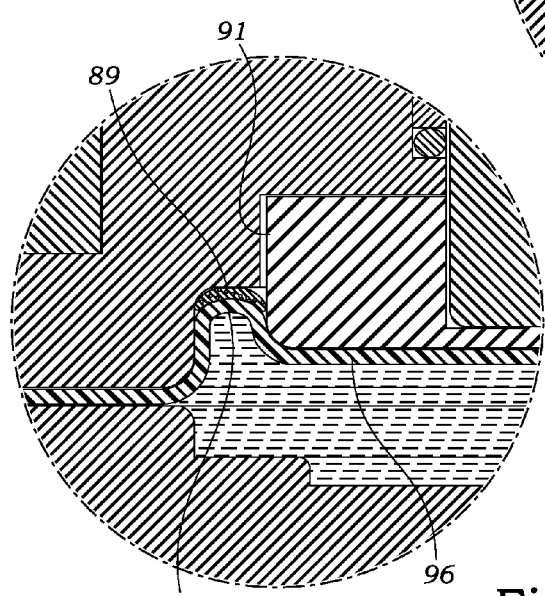

Turning now to the alternate embodiment shown in FIGS. 6A-6C, there is shown an actuator device having an additional flexible component part for the diaphragm convolution to come into contact with during over-pressurization after actuation of the valve. Specifically, an insert 89 having a somewhat U-shaped profile or cross-section is installed within the annular groove 88 in an actuator arrangement that is otherwise substantially similar to that shown in FIGS. 5A-5C, with the exception of the groove depth so as to accommodate the insert 89 and the potentially increased gap width between the piston 90 and the cylinder, or the second piston travel stop seating member bore 85, as accommodated by the insert 89. As will be appreciated regarding the first embodiment shown in FIGS. 5A-5C, the effectiveness of such a design relies, in part, on close tolerances, or a relatively small gap between the piston and cylinder, for the reasons discussed above, at which intersection there is an inherent sharp ninety degree corner between the piston and cylinder that remains a potential failure point as well. Relatedly, there is potential for some drag and interference due to the close tolerances. With the installation of the U-shaped insert 89 at the bottom of the groove 88 as in the alternate embodiment of FIGS. 6A-6C, it will thus be appreciated that the foregoing concerns related to the first exemplary embodiment are substantially eliminated. Essentially, the alternate actuator design performs in substantially the same manner as the backstop step or groove 88 alone as discussed above in connection with FIGS. 5A-5C, while offering several further advantages. Initially, as shown in FIG. 6A, when the diaphragm convolution loop 98 is in its normal operating range it will not come into contact with the U-shaped insert 89 just as it did not with the bottom of the groove 88 in the analogous operational position of the first exemplary embodiment shown in FIG. 5A. And since the U-shaped insert 89 is flexible, as based on its shape and material, the inner lip 93 thereof closest to the piston 90 will, by design, in its unloaded or un-flexed state, as when the diaphragm loop 98 is not yet in contact with the U-shaped insert 89, be positioned slightly away from the piston wall 91 so that it will not cause drag on the piston 90 during normal operation. Then, as shown in FIG. 6B, when the piston 90 reaches its travel stop 87 (FIG. 6A) and the diaphragm convolution loop 98 just comes into contact with the U-shaped insert 89 as when the pressure acting on the rolling diaphragm 96 through the non-compressible liquid 48 is increasing so as to open the valve, the loop 98 from that point on in terms of pressurization will begin to push on and flex the U-shaped insert 89. This process would continue until the pressure increases to something on the order of the higher proof pressure, as shown in FIG. 6C, at which point the inner lip 93 (FIG. 6A) of the U-shaped insert 89 will be pushed radially inward into contact with the piston wall 91 and the convolution loop 98 will itself substantially conform to the smooth, curved upper surface 95 (FIG. 6A) of the U-shaped insert 89. Accordingly, since the U-shaped insert 89 thereby provides a substantially smooth, curved surface 95 spanning the groove 88 from cylinder to piston with essentially no corners or sharp transitions, the insert 89 will substantially completely support the convolution loop 98 while effectively eliminating potential pinch points and so have the ability to withstand even relatively higher pressures. Furthermore, as shown in FIGS. 6A-6C, the clearance between the piston 90 and the cylinder or the second piston travel stop seating member bore 85 (FIGS. 6A and 6B) may be greater in this alternate embodiment incorporating the U-shaped insert 89 within the annular groove 88, providing further advantages in manufacturing and use while again not compromising performance of the backstop feature or the burst pressure of the rolling diaphragm 96. While two specific rolling diaphragm "backstop" designs have thus been presented herein relating to increasing the pressurization such diaphragms can operate under, it will be appreciated that aspects of the present invention have broad applicability to mechanisms in a variety of contexts incorporating rolling diaphragms of other sizes and strokes.

As will be appreciated from the foregoing, the present invention is described as a "high pressure actuator regulating valve" primarily because of two innovations that enable the valve to operate at relatively higher actual and proof pressures. First, the liquid-filled bellows assembly 30 enables the bellows 44 to see and expand under relatively higher refrigerant or other fluid pressures without failure and so transfer such pressure "readings" or mechanically transmit the attendant bellows movement to a piston 90 and pushrod 92 so as to selectively open the valve 10, all while movement of the non-compressible liquid 48 between that surrounding the bellows 44 to that surrounding the piston 90 is through a regulating orifice 36 so as to provide resistance to rapid pressure changes and limits "chatter" or unwanted vibration of the actuator assembly 80 by effectively slowing down the valve response rate. And second, the design of the actuator rolling diaphragm 96 itself as positioned about a portion of the piston 90 and configured with a "backstop" for the diaphragm loop 98 enables the diaphragm 96 to withstand and transmit through the non-compressible liquid 48 surrounding the bellows 44 the movement to the piston 90.

To summarize, regarding the exemplary high pressure actuator regulating valve of the present invention as employed in the context of refrigeration systems, it will be appreciated that a device is provided for improved construction and use in a variety of relatively high pressure applications. Because the principles of the invention may be practiced in a number of configurations beyond those shown and described, it is to be understood that the invention is not in any way limited by the exemplary embodiments or context but is instead able to take numerous forms without departing from the spirit and scope of the invention. Furthermore, the various features of each of the above-described embodiments may be combined in any logical manner and are intended to be included within the scope of the present invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An actuator regulating valve apparatus comprising:
   an actuator assembly operably installed within a valve body assembly of the apparatus, the actuator assembly comprising:
   a piston travel stop seating member;
   a piston operable within the piston travel stop seating member and having an effective working surface defining an effective working area; and
   a pushrod installed on the piston and operably engaged with the valve body assembly;
   a bellows assembly operably installed adjacent to the actuator assembly and comprising:
   a bellows assembly base installed on the piston travel stop seating member so as to be spaced from the piston and having formed therein an orifice for fluid communication therethrough, the orifice having a through area that is approximately 0.05% to 5% of the effective working area of the piston, the bellows assembly base defining in conjunction with the piston travel stop seating member and the piston effective working surface a piston exterior space;
   a bellows assembly wall installed on the bellows assembly base;
   a bellows assembly end cap installed on the bellows assembly wall substantially opposite the bellows assembly base, the bellows assembly end cap having formed therein a port for communication therethrough of a fluid; and
   a bellows installed on the bellows assembly end cap such that a bellows interior space is in fluid communication with the port and further such that a bellows exterior space as bounded by the bellows, the bellows assembly end cap, the bellows assembly wall, and the bellows assembly base is in fluid communication with the piston exterior space and thus the effective working surface of the piston by way of the orifice; and
   a non-compressible liquid substantially filling the bellows exterior space, the orifice, and the piston exterior space, whereby movement of the bellows based on pressure changes in the fluid translates to movement of the piston as acted on by the liquid and regulated by the orifice.

2. The apparatus of claim 1 further comprising an actuator rolling diaphragm trapped between the bellows assembly base and the piston travel stop seating member so as to partially cover and engage the piston.

3. The apparatus of claim 1 wherein:
   the piston travel stop seating member has a first piston travel stop seating member bore formed therein and a second piston travel stop seating member bore formed below and larger than the first piston travel stop seating member bore, the top surface of the second piston travel stop seating member bore defining a piston travel stop;
   the piston is operable substantially within the second piston travel stop seating member bore; and
   the pushrod is configured to extend from the piston through the first piston travel stop seating member bore so as to operably engage a valve cap of the valve body assembly.

4. The apparatus of claim 3 wherein:
   the piston is formed having an outside diameter that is substantially equivalent to the diameter of the second piston travel stop seating member bore; and
   the piston is further operable within a third piston travel stop seating member bore formed below, concentric with, and larger than the second piston travel stop seating member bore, the outside diameter of the piston being substantially smaller than the diameter of the third piston travel stop seating member bore.

5. The apparatus of claim 4 further comprising an actuator rolling diaphragm trapped between the bellows assembly base and the piston travel stop seating member so as to partially cover and engage the piston.

6. The apparatus of claim 5 wherein:
   an annular groove about the piston is defined by a sidewall of the piston and the third piston travel stop seating member bore; and
   a convolution loop of the actuator rolling diaphragm is suspended within the groove, whereby the groove effectively becomes a mechanical backstop support for the convolution loop.

7. The apparatus of claim 6 wherein a U-shaped insert is inserted in the groove, the U-shaped insert having a curved upper surface for engagement therewith of the convolution loop and an inner lip adjacent to the piston, whereby upon pressurization on the piston and actuator rolling diaphragm by the non-compressible liquid, the convolution loop will substantially conform to the curved upper surface of the U-shaped insert and the inner lip of the U-shaped insert will be pushed radially inwardly into contact with the piston sidewall, thus providing a relatively smooth surface spanning the groove against which the convolution loop is seated under relatively high pressure.

8. The apparatus of claim 4 wherein an upwardly-opening first bellows assembly base bore formed in the bellows assembly base is in communication with the third piston travel stop seating member bore.

9. The apparatus of claim 8 wherein the bellows assembly base is further formed with an upwardly-opening second bellows assembly base bore having a diameter smaller than that of the first bellows assembly base bore and with a downwardly-opening third bellows assembly base bore, the orifice being formed so as to communicate and regulate the flow of non-compressible liquid between the second and third bellows assembly base bores, whereby the non-compressible liquid fills the third bellows assembly base bore, the orifice, the first and second bellows assembly base bores, and at least a portion of the third piston travel stop seating member bore.

10. The apparatus of claim 1 further comprising a biasing assembly operably installed on the valve body assembly substantially opposite the bellows assembly and configured to bias the apparatus closed.

11. The apparatus of claim 10 wherein a spring sub-assembly of the biasing assembly comprises a spring mounted in compression between a first spring plate coupled to the pushrod of the actuator assembly and a second spring plate threadably engaging an adjustment screw rotatably installed within a housing itself installed on the valve body assembly substantially opposite the bellows assembly so as to at least partially encase the spring, whereby the spring exerts a downward biasing force on the first spring plate and thus the pushrod and a valve cap of the valve body assembly installed on the pushrod so as to bias the apparatus closed.

12. The apparatus of claim 11 wherein a balancing diaphragm sub-assembly of the biasing assembly comprises a balancing diaphragm mounted on the pushrod below the first spring plate of the biasing assembly, the balancing diaphragm being configured to extend substantially radially outwardly from the pushrod so as to span an opening formed in a valve body of the valve body assembly substantially in-line with a valve seat on which the valve cap seats and substantially opposite the installation of the piston travel stop seating member, whereby the bellows assembly, the actuator assembly, and the biasing assembly, including the balancing diaphragm sub-assembly, are substantially axially aligned so as to collectively operate as the apparatus opens and closes through the axial movement of the piston and the pushrod, the perimeter edge of the balancing diaphragm being pinched between the valve body at the opening and a balancing diaphragm retaining cap installed thereover substantially between the valve body and the spring sub-assembly housing.

13. The apparatus of claim 12 wherein:
the balancing diaphragm is pinched between a first balancing diaphragm ring concentrically installed on the pushrod below the balancing diaphragm and seated atop the valve cap and between a second balancing diaphragm ring installed above the balancing diaphragm and secured in place as by a threaded first spring plate connector, whereby the balancing diaphragm flexibly spans the opening of the valve body so as to form a space above the balancing diaphragm as substantially bounded by the balancing diaphragm retaining cap and a space below the balancing diaphragm within the valve body; and
channels are formed within the valve cap, the first balancing diaphragm ring, the balancing diaphragm, and the second balancing diaphragm ring substantially axially along each between an interior surface thereof and the outer surface of the pushrod, whereby when the apparatus is closed as by the valve cap being seated on the valve seat, positive pressure building on an inlet side of the apparatus passes along the channels and exits through the second balancing diaphragm ring into the space above the balancing diaphragm, such that the pressure above the balancing diaphragm will come to substantially equal the pressure on the inlet side of the apparatus, thereby exerting through the balancing diaphragm and its installation on the pushrod a downward force on the valve cap substantially equal and opposite to the upward force exerted on the valve cap based on the pressure in the inlet side of the apparatus, further whereby the spring sub-assembly of the biasing assembly need only counteract a set-point pressure of the bellows assembly.

14. The apparatus of claim 13 wherein the balancing diaphragm retaining cap is formed having a first balancing diaphragm retaining cap bore configured to slidably receive the pushrod, a downwardly-opening second balancing diaphragm retaining cap bore below and having a slightly larger diameter than that of the first balancing diaphragm retaining cap bore and having installed therein a sealing element so as to substantially seal about the first spring plate connector threadably installed on the pushrod, and a downwardly-opening third balancing diaphragm retaining cap bore having an inside diameter larger than that of both the first and second balancing diaphragm retaining cap bores and the outside diameter of the second balancing diaphragm ring so as to form the space behind the balancing diaphragm opposite the valve cap and valve seat.

15. An actuator regulating valve apparatus comprising:
an actuator assembly operably installed within a valve body assembly of the apparatus, the actuator assembly comprising:
a piston travel stop seating member;
a piston operable within the piston travel stop seating member;
a pushrod installed on the piston and configured to extend therefrom for operable engagement with the valve body assembly;
an actuator rolling diaphragm trapped adjacent the piston travel stop seating member so as to partially cover and engage the piston, a convolution loop of the actuator rolling diaphragm being suspended within an annular groove about the piston, whereby the groove effectively becomes a mechanical backstop support for the convolution loop; and
a U-shaped insert inserted in the groove, the U-shaped insert having a curved upper surface for engagement therewith of the convolution loop and an inner lip adjacent to the piston;
a bellows assembly operably installed adjacent to the actuator assembly and comprising:
a bellows assembly base installed on the piston travel stop seating member so as to be spaced from the piston and having formed therein an orifice for fluid communication therethrough; and a bellows installed within the bellows assembly opposite the bellows assembly base and in fluid communication with an effective working surface of the piston by way of the orifice; and a non-compressible liquid filling the apparatus about the bellows and the effective working surface of the piston, whereby movement of the bellows translates to movement of the piston as acted on by the liquid and regulated by the orifice, relatively high pressurization on the piston and actuator rolling diaphragm by the non-compressible liquid causing the convolution loop to substantially conform to the curved upper surface of the U-shaped insert and the inner lip of the U-shaped insert to be pushed radially inwardly into contact with the piston, thus providing a relatively smooth surface spanning the groove against which the convolution loop is seated.

16. The apparatus of claim 15 wherein:
the effective working surface defines an effective working area of the piston; and
the orifice has a through area that is approximately 0.05% to 5% of the effective working area.

17. An actuator regulating valve apparatus comprising:
an actuator assembly operably installed within a valve body assembly of the apparatus, the actuator assembly comprising:
  a piston travel stop seating member;
  a piston operable within the piston travel stop seating member;
  a pushrod installed on the piston and configured to extend therefrom for operable engagement with the valve body assembly;
  an actuator rolling diaphragm trapped adjacent the piston travel stop seating member so as to partially cover and engage the piston, a convolution loop of the actuator rolling diaphragm being suspended within an annular groove about the piston, whereby the groove effectively becomes a mechanical backstop support for the convolution loop; and
  a U-shaped insert inserted in the groove, the U-shaped insert having a curved upper surface for engagement therewith of the convolution loop and an inner lip adjacent to the piston;
a bellows assembly operably installed adjacent to the actuator assembly and comprising:
  a bellows assembly base installed on the piston travel stop seating member so as to be spaced from the piston and having formed therein an orifice for fluid communication therethrough; and
  a bellows installed within the bellows assembly opposite the bellows assembly base and in fluid communication with an effective working surface of the piston by way of the orifice;
a biasing assembly operably installed on the valve body assembly substantially opposite the bellows assembly and configured to bias the apparatus closed, the biasing assembly comprising:
  a spring sub-assembly having a spring configured to exert a downward biasing force on the pushrod and a valve cap of the valve body assembly installed on the pushrod so as to bias the apparatus closed; and
  a balancing diaphragm sub-assembly having a balancing diaphragm mounted on the pushrod, the balancing diaphragm being configured to extend substantially radially outwardly from the pushrod so as to span an opening formed in a valve body of the valve body assembly substantially in-line with a valve seat on which the valve cap seats and substantially opposite the installation of the piston travel stop seating member, whereby the bellows assembly, the actuator assembly, and the biasing assembly are substantially axially aligned so as to collectively operate as the apparatus opens and closes through the axial movement of the piston and the pushrod, the perimeter edge of the balancing diaphragm being pinched between the valve body at the opening and a balancing diaphragm retaining cap installed thereover substantially between the valve body and the spring sub-assembly; and
a non-compressible liquid filling the apparatus about the bellows and the effective working surface of the piston, whereby movement of the bellows translates to movement of the piston as acted on by the liquid and regulated by the orifice, relatively high pressurization on the piston and actuator rolling diaphragm by the non-compressible liquid causing the convolution loop to substantially conform to the curved upper surface of the U-shaped insert and the inner lip of the U-shaped insert to be pushed radially inwardly into contact with the piston, thus providing a relatively smooth surface spanning the groove against which the convolution loop is seated, further whereby the balancing diaphragm acts on the pushrod to produce a force substantially equal and opposite to the pressure in an inlet side of the apparatus such that the spring sub-assembly of the biasing assembly need only counteract a set-point pressure of the bellows assembly.

* * * * *